United States Patent
Filev et al.

(10) Patent No.: US 10,614,801 B2
(45) Date of Patent: Apr. 7, 2020

(54) PROTOCOL BASED COMPUTER NETWORK EXPOSURE INTERVAL CONTENT ITEM TRANSMISSION

(71) Applicant: Google Inc., Mountain View, CA (US)

(72) Inventors: Momchil Filev, Mountain View, CA (US); Martin Freund, Mountain View, CA (US); Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 15/498,237

(22) Filed: Apr. 26, 2017

(65) Prior Publication Data

US 2018/0219969 A1    Aug. 2, 2018

Related U.S. Application Data

(63) Continuation-in-part of application No. 15/395,682, filed on Dec. 30, 2016, now Pat. No. 10,013,978, and
(Continued)

(51) Int. Cl.
*G10L 15/18* (2013.01)
*H04L 29/08* (2006.01)
(Continued)

(52) U.S. Cl.
CPC .... *G10L 15/1822* (2013.01); *G10L 2015/088* (2013.01); *G10L 2015/223* (2013.01); *H04L 67/10* (2013.01)

(58) Field of Classification Search
CPC .......... G10L 15/1822; G10L 2015/088; G10L 2015/223; H04L 67/10
See application file for complete search history.

(56) References Cited

U.S. PATENT DOCUMENTS 6,044,347 A    3/2000    Abella et al.
6,275,806 B1    8/2001    Pertrushin
(Continued)

FOREIGN PATENT DOCUMENTS

JP    2011-210238    10/2011
KR    10-0481141 B1    3/2005
(Continued)

OTHER PUBLICATIONS

"Walmart and Google to offer voice-enabled shopping", BBC News, Aug. 23, 2017 (10 pages).
(Continued)

*Primary Examiner* — Uzma Alam
(74) *Attorney, Agent, or Firm* — Foley & Lardner LLP; James De Vellis

(57) ABSTRACT

Systems and methods of the present disclosure relate generally to a data processing system that optimizes or dynamically content items for transmission to client computing devices. The data processing system can improve the efficiency and effectiveness of data packet transmission over one or more computer networks by, for example, dynamically selecting content items from a plurality of content items for transmission to a client computing device. The system can reduce network bandwidth utilization by selecting content items that substantially match the predicted exposure interval of the content segments. Matching the content item length to the predicted exposure length can reduce network bandwidth utilization by not transmitting content items to the client computing device with a low probability of presentation.

20 Claims, 11 Drawing Sheets

Related U.S. Application Data a continuation-in-part of application No. 13/532,209, filed on Jun. 25, 2012, now Pat. No. 9,767,479.

(51) Int. Cl.
*G10L 15/22* (2006.01)
*G10L 15/08* (2006.01)

(56) References Cited

U.S. PATENT DOCUMENTS

| | | | |
|---|---|---|---|
| 6,684,249 B1 | 1/2004 | Frerichs et al. | |
| 6,857,007 B1* | 2/2005 | Bloomfield | H04N 1/00209 358/402 |
| 6,907,566 B1 | 6/2005 | McElfresh et al. | |
| 7,668,754 B1 | 2/2010 | Bridgelall | |
| 7,853,255 B2 | 12/2010 | Karaoguz et al. | |
| 7,979,877 B2 | 7/2011 | Huber et al. | |
| 8,165,886 B1 | 4/2012 | Gagnon et al. | |
| 8,195,133 B2 | 6/2012 | Ramer et al. | |
| 8,249,925 B2 | 8/2012 | Broms et al. | |
| 8,370,197 B2 | 2/2013 | Axe et al. | |
| 8,386,386 B1 | 2/2013 | Zhu | |
| 8,849,694 B1 | 9/2014 | Chatterjee et al. | |
| 8,903,716 B2 | 12/2014 | Chen et al. | |
| 9,424,840 B1 | 8/2016 | Hart et al. | |
| 9,767,479 B2 | 9/2017 | Filev et al. | |
| 10,013,978 B1 | 7/2018 | Bhaya et al. | |
| 10,089,647 B2* | 10/2018 | Juhasz | G06Q 30/0244 |
| 2002/0102988 A1 | 8/2002 | Myllymaki | |
| 2002/0116287 A1 | 8/2002 | Schubert et al. | |
| 2002/0116313 A1 | 8/2002 | Detering | |
| 2004/0044516 A1* | 3/2004 | Kennewick | G10L 15/22 704/5 |
| 2004/0193488 A1 | 9/2004 | Khoo et al. | |
| 2005/0267798 A1 | 12/2005 | Panara | |
| 2006/0224445 A1 | 10/2006 | Axe et al. | |
| 2007/0073723 A1 | 3/2007 | Ramer et al. | |
| 2007/0097975 A1 | 5/2007 | Rakers et al. | |
| 2007/0127688 A1 | 6/2007 | Doulton | |
| 2007/0281716 A1 | 12/2007 | Altman et al. | |
| 2008/0015863 A1* | 1/2008 | Agapi | G10L 15/22 704/275 |
| 2008/0248815 A1 | 10/2008 | Busch | |
| 2008/0250453 A1 | 10/2008 | Smith et al. | |
| 2009/0030800 A1* | 1/2009 | Grois | G06Q 30/02 705/14.52 |
| 2009/0070211 A1 | 3/2009 | Gonen | |
| 2009/0192929 A1 | 7/2009 | Hoeflinger et al. | |
| 2009/0204410 A1 | 8/2009 | Mozer et al. | |
| 2009/0228270 A1 | 9/2009 | Odell et al. | |
| 2009/0292587 A1* | 11/2009 | Fitzgerald | G06Q 30/02 705/7.29 |
| 2009/0326966 A1 | 12/2009 | Callaghan et al. | |
| 2010/0010890 A1 | 1/2010 | Ditkovski et al. | |
| 2010/0023396 A1 | 1/2010 | Subramanian et al. | |
| 2010/0050098 A1 | 2/2010 | Turner | |
| 2010/0057639 A1 | 3/2010 | Schwarz et al. | |
| 2010/0088719 A1 | 4/2010 | Hawkins et al. | |
| 2010/0292991 A1 | 11/2010 | Lv | |
| 2011/0035379 A1 | 2/2011 | Chen et al. | |
| 2011/0067099 A1 | 3/2011 | Barton et al. | |
| 2011/0078014 A1 | 3/2011 | Feldman et al. | |
| 2011/0208596 A1 | 8/2011 | Kwon et al. | |
| 2011/0246286 A1 | 10/2011 | Cetin et al. | |
| 2012/0030034 A1 | 2/2012 | Knapp et al. | |
| 2012/0041766 A1 | 2/2012 | Gong et al. | |
| 2012/0123856 A1* | 5/2012 | Paunikar | G06Q 30/02 705/14.48 |
| 2012/0130798 A1 | 5/2012 | Cooley et al. | |
| 2012/0203627 A1 | 8/2012 | Balseiro et al. | |
| 2012/0265528 A1* | 10/2012 | Gruber | G10L 15/18 704/235 |
| 2013/0036202 A1 | 2/2013 | Lahav | |
| 2013/0063550 A1 | 3/2013 | Ritchey et al. | |
| 2013/0066725 A1* | 3/2013 | Umeda | G06Q 30/0275 705/14.66 |
| 2013/0111487 A1 | 5/2013 | Cheyer et al. | |
| 2013/0117022 A1* | 5/2013 | Chen | G10L 15/22 704/235 |
| 2013/0151332 A1 | 6/2013 | Yan et al. | |
| 2013/0275164 A1* | 10/2013 | Gruber | G10L 17/22 705/5 |
| 2013/0304758 A1 | 11/2013 | Gruber et al. | |
| 2013/0317823 A1 | 11/2013 | Mengibar | |
| 2014/0067455 A1 | 3/2014 | Zhang et al. | |
| 2014/0278981 A1 | 9/2014 | Mersov et al. | |
| 2015/0194167 A1 | 7/2015 | Jeong | |
| 2015/0363748 A1 | 12/2015 | Beaurepaire et al. | |
| 2016/0042736 A1 | 2/2016 | Lee et al. | |
| 2016/0104200 A1 | 4/2016 | Osotio et al. | |
| 2016/0357519 A1 | 12/2016 | Vargas | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |
| 2018/0052573 A1 | 2/2018 | Comertoglu et al. | |
| 2018/0190276 A1 | 7/2018 | Bhaya et al. | |
| 2018/0308484 A1 | 10/2018 | Bhaya et al. | |

FOREIGN PATENT DOCUMENTS

| | | | |
|---|---|---|---|
| KR | 10-2008-0072673 A | 8/2008 | |
| KR | 10-2012-0110751 A | 10/2012 | |
| KR | 10-2012-0137425 A | 12/2012 | |
| KR | 1020120137425 A | 12/2012 | |
| WO | WO-2007/064482 A1 | 6/2007 | |

OTHER PUBLICATIONS

Crist, Ry, "Logitech Harmony's Alexa Skill just got a whole lot better", cnet, Jul. 13, 2017 (2 pages).
Gibbs, Samuel, "Your Facebook Messenger app is about to be filled with ads", The Guardian, Jul. 12, 2017 (3 pages).
Hardwick, Tim, "Facebook Smart Speaker Coming Next Year With 15-inch Touch Panel", MacRumors, Jul. 25, 2017 (5 pages).
Kelion, Leo, "Amazon's race to make Alexa smarter", BBC News, Jul. 28, 2017 (8 pages).
U.S. Office Action on U.S. Appl. No. 12/851,833 dated Aug. 8, 2012 (10 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion for PCT Appl. Ser. No. PCT/US2017/049709 dated Dec. 5, 2017, 12 pages.
Johnston, "Amazon Whirlwind: New Echo, Plus, Spot, Connect, Fire TV Take The Stage", Twice, Sep. 27, 2017, 4 pages.
Kelion, "Amazon revamps Echo smart speaker family", BBC News, Sep. 27, 2017, 11 pages.

(56) References Cited

OTHER PUBLICATIONS

Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
"Amazon and Google Want to Turn Their Smart Home Speakers Into Telephone Replacements—Mac Rumors" MacRumors, 9 pages.
"Apple Patent Reveals a New Security Feature Coming to Siri" 6 pages.
"Introducing Echo Look Hands-Free Camera and Style Assistant" 1996-2017, Amazon.com, Inc. 5 pages.
"The Patent Behind Google Home's New Feature of Understanding Different Voices in the Home Surfaced Today", Apr. 20, 2017, 5 pages.
Close, "Amazon Echo Will Give You These Deals If You Order Through Alexa This Weekend," Web Article, Nov. 18, 2016, Time.com (2 pages).
Collins, Terry "Can Twitter Save itself? The Social Network is Slowly gaining users, but still Lags Far Behind Rivals. Is a Turnaround Possible?" 3 pages.
Cook, "A Siri for advertising: These mobile ads talk back to you," Web Article, Apr. 1, 2013, Geekwire.com (7 pages).
Golgowski, Nina, "This Burger King Ad Is Trying to Control Your Google Home Device", Apr. 12, 2017, 7 pages.
International Preliminary Report on Patentability for PCT/US2013/047593 dated Jan. 8, 2015 (8 pages).
International Search Report and Written Opinion on PCT/US2013/047593 (12 pages).
Larson, Selena "Google Home Now Recognizes your Individual Voice" dated Apr. 20, 2017, 3 pages.
Nieva, Richard, "Google Home and eBay can tell you how much that's worth", 3 pages.
Purcher, Jack "Today Google Home's Virtual Assistant Can Learn its Owner's Voice for Security Reason's like Apple's Patent Pending Idea" Apr. 20, 2017, 4 pages.
Seifert, Dan "Samsung's New Virtual Assistant Will Make Using Your Phone Easier", Mar. 20, 2017, 7 pages.
Sherr, Ian "IBM Built a Voice Assistant for Cybersecurity" dated Feb. 13, 2017, 4 pages.
Siegal, Daniel, "IP Attys Load Up Apps' Legal Challenges at Silicon Beach" 6 pages.
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com.
U.S. Notice of Allowance on U.S. Appl. No. 13/532,209 dated Mar. 31, 2017.
U.S. Office Action on U.S. Appl. No. 13/532,209 dated Mar. 4, 2014.
U.S. Office Action on U.S. Appl. No. 13/532,209 dated Oct. 28, 2016.
U.S. Office Action on U.S. Appl. No. 13/532,209 dated Nov. 4, 2013.
U.S. Office Action on U.S. Appl. No. 13/532,209 dated Jul. 3, 2013.
U.S. Appl. No. 13/532,209, filed Jun. 25, 2012.
"Going with CPT (cost per time) over CPM for Ads", Startup Nation Business Forum, 3 pages.
Ad Traders, "Attention Economics Pricing in Advertising: Cost Per Second" Ad Exchanger, 5 pages.
Ad Traders, "Attention Economics Pricing in Advertising: Cost Per Second", Ad Exchanger, http://www.adexchanger.com/data-driven-thinking/attention-economics/, Oct. 19, 2010, [Retrieved from website Jun. 22, 2015].
Anita Wilhelm, Yuri Takhteyev, Risto Sarvas, Nancy Van House, and Marc Davis. 2004. Photo annotation on a camera phone. In CHI '04 Extended Abstracts on Human Factors in Computing Systems (CHI EA '04). ACM, New York, NY, USA, 1403-1406. DOI=http://dx.doi.org/10.1145/985921.986075.
Broussard, Mitchel, "Chatbot-Like Siri Patent Includes Intelligent Image, Video, and Audio Recognition Within Messages", MacRumors, May 11, 2017, 11 pages.
Chen, Yilun Lulu, "Alibaba Challenges Google, Amazon With New Echo-Like Device", Bloomberg, Jul. 5, 2017, 3 pages.
Donald J. Patterson, Xianghua Ding, Nicholas Noack. 2006. Nomatic: Location by, for, and of crowds. Proceedings of International Workshop on Location- and Context-Awareness LoCA 2006. 186-203. DOI=10.1007/11752967_13.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '" Cnet, May 18, 2017, 7 pages.
Giovanni Iachello, Ian Smith, Sunny Consolvo, Gregory D. Abowd, Jeff Hughes, James Howard, Fred Potter, James Scott, Timothy Sohn, Jeffrey Hightower, Anthony LaMarca. 2005. Control, Deception, and Communication: Evaluating the Deployment of a Location-Enhanced Messaging Service. In 7th International Conference, UbiComp 2005, Tokyo, Japan, Sep. 11-14, 2005. Proceedings, 213-231. DOI= 10.1007/11551201_13.
Giovanni Iachello, Ian Smith, Sunny Consolvo, Mike Chen, and Gregory D. Abowd. 2005. Developing privacy guidelines for social location disclosure applications and services. In Proceedings of the 2005 symposium on Usable privacy and security (SOUPS '05). ACM, New York, NY, USA, 65-76. DOI=http://dx.doi.org/10.1145/1073001.1073008.
Google Developers Newsletter "Google Assistant SDK", developers.google.com, 2 pages.
Gurma, Mark and Webb, Alex, "Apple is Manufacturing a Siri Speaker to Outdo Google and Amazon", Bloomberg, May 31, 2017, 3 pages.
Ian Smith, Sunny Consolvo, Anthony Lamarca, Jeffrey Hightower, James Scott, Timothy Sohn, Jeff Hughes, Giovanni Iachello, Gregory D. Abowd. 2005. Social Disclosure of Place: From Location Technology to Communication Practices. Third International Conference, Pervasive 2005. 134-151. DOI= 10.1007/11428572_9.
Ian Smith. 2005. Social-Mobile Applications. Computer 38, 4 (Apr. 2005), 84-85. DOI=http://dx.doi.org/10.1109/MC.2005.140.
International Preliminary Report on Patentability on PCT/US2014/036341 dated Dec. 15, 2015, 6 pgs.
International Search Report and Written Opinion in PCT Application No. PCT/US2014/036341 dated Sep. 2, 2014.
Juhong Liu, O. Wolfson and Huabei Yin. 2006. Extracting Semantic Location from Outdoor Positioning Systems. 7th International Conference on Mobile Data Management. doi: 10.1109/MDM.2006.87.
Koetsier, John, "Ads on Amazon Echo: Wendy's, ESPN, and Progressive Among Brands Testing", Forbes, May 11, 2017, 3 pages.
Lee, Dave, "The five big announcements from Google I/O", BBC, May 18, 2017, 11 pages.

(56) References Cited

OTHER PUBLICATIONS

Marc Davis, Michael Smith, Fred Stentiford, Adetokunbo, John Canny, Nathan Good, Simon King, Rajkumar Janakiraman. 2006. Using context and similarity for face and location identification. In Proceedings of the IS&T/SPIE 18th Annual Symposium on Electronic Imaging Science and Technology.

Marc Davis, Nancy Van House, Jeffrey Towle, Simon King, Shane Ahern, Carrie Burgener, Megan Finn, Vijay Viswanathan, Matthew Rothenberg. 2005. MMM2: Mobile Media Metadata for Media Sharing. In Extended Abstracts of the Conference on Human Factors in Computing Systems. ACM, New York, NY, USA, 1335-1338.

Marc Davis, Simon King, Nathan Good, and Risto Sarvas. 2004. From context to content: leveraging context to infer media metadata. In Proceedings of the 12th annual ACM international conference on Multimedia (Multimedia '04). ACM, New York, NY, USA, 188-195. DOI=http://dx.doi.org/10.1145/1027527.1027572.

Perez, Sarah, "The first ad network for Alexa Skills shuts down following Amazon's policy changes", Tech Crunch, Jun. 15, 2017, 8 pages.

Porter, Jon, "Amazon Echo Show release date, price, news and features", Tech Radar, Jun. 26, 2017, 11 pages.

Risto Sarvas, Erick Herrarte, Anita Wilhelm, and Marc Davis. 2004. Metadata creation system for mobile images. In Proceedings of the 2nd international conference on Mobile systems, applications, and services (MobiSys '04). ACM, New York, NY, USA, 36-48. DOI= http://dx.doi.org/10.1145/990064.990072.

Sablich, Justin, "Planning a Trip With the Help of Google Home", New York Times, dated May 31, 2017, 6 pages.

Smith, Dave, "The Amazon Echo got 2 incredibly useful features thanks to a new update", Business Insider, Jun. 1, 2017, 2 pages.

Spalding, Steve, "How to Cost User Engagement", How to Spilt an Atom—Ideas Reborn, 4 pages.

Spalding, Steve, "How to Cost User Engagement", How to Split an Atom—Ideas Reborn, http://howtosplitanatom.com/how-to-read-shorts/how-to-cost-user-engagement/, Sep. 20, 2007, [Retrieved from website Jun. 22, 2015].

Takashi Yoshino, Tomohiro Muta and Jun Munemori. 2002. NAMBA: location-aware collaboration system for shopping and meeting. IEEE Transactions on Consumer Electronics, vol. 48, No. 3. 470-477. doi: 10.1109/TCE.2002.1037030.

U.S. Notice of Allowance on U.S. Appl. No. 13/532,209 dated Jul. 10, 2017.

U.S. Notice of Allowance on U.S. Appl. No. 13/790,087 dated Jan. 6, 2016.

U.S. Office Action on U.S. Appl. No. 13/790,087 dated Jan. 26, 2017.

U.S. Office Action on U.S. Appl. No. 13/790,087 dated Jun. 9, 2016.

U.S. Office Action on U.S. Appl. No. 13/916,407 dated Jun. 19, 2015.

U.S. Office Action on U.S. Appl. No. 13/916,407 dated Nov. 17, 2015.

U.S. Office Action on U.S. Appl. No. 13/972,379 dated Jun. 24, 2015.

Willens, Max, "For publishers, Amazon Alexa holds promise but not much money (yet)", Digiday, Jul. 6, 2017, 5 pages.

U.S. Notice of Allowance for U.S. Appl. No. 15/395,682 dated Feb. 26, 2018 (9 pages).

Buckland et al., "Amazon's Alexa Takes Open-Source Route to Beat Google Into Cars", Bloomberg, Feb. 27, 2018, 6 pages.

Communication pursuant to Article 94(3) EPC for EP Application No. 17772516.5 dated Mar. 27, 2019.

Final Office Action on U.S. Appl. No. 15/596,943 dated Apr. 9, 2019.

Non-Final Office Action on U.S. Appl. No. 15/091,323 dated Feb. 25, 2019.

Non-Final Office Action on U.S. Appl. No. 15/584,839 dated Feb. 25, 2019.

Non-Final Office Action on U.S. Appl. No. 15/596,943 dated Dec. 19, 2018.

Non-Final Office Action on U.S. Appl. No. 15/632,924 dated May 1, 2019.

Notice of Reasons for Rejection for JP Application No. 2017-556903 dated Feb. 25, 2019.

Office Action for Korean Patent Application No. 10-2017-7031607 dated Jan. 24, 2019.

U.S. Notice of Allowance for U.S. Appl. No. 15/395,682 dated Feb. 26, 2018.

Decision to Grant a Patent for JP 2017-556903 dated Oct. 7, 2019 (5 pages).

Final Office Action for U.S. Appl. No. 13/790,121 dated Dec. 17, 2014 (5 pages).

Non-Final Office Action for U.S. Appl. No. 13/790,121 dated Aug. 13, 2014 (6 pages).

Non-Final Office Action for U.S. Appl. No. 15/584,839 dated Sep. 6, 2019 (17 pages).

Non-Final Office Action for U.S. Appl. No. 15/632,924 dated Oct. 9, 2019 (17 pages).

Non-Final Office Action for U.S. Appl. No. 16/018,854 dated Oct. 4, 2019 (23 pages).

Notice of Allowance for U.S. Appl. No. 13/790,121 dated Aug. 27, 2015 (8 pages).

Notice of Allowance for U.S. Appl. No. 13/790,121 dated Jun. 9, 2014 (8 pages).

Reason for Refusal for KR 10-2017-7031607 dated Sep. 16, 2019 (7 pages).

* cited by examiner

PROTOCOL BASED COMPUTER NETWORK EXPOSURE INTERVAL CONTENT ITEM TRANSMISSION

CROSS-REFERENCE TO RELATED APPLICATIONS

This application claims the benefit and priority under 35 U.S.C. § 120 as a continuation-in-part of U.S. patent application Ser. No. 13/532,209, filed on Jun. 25, 2012. This application also claims the benefit and priority under 35 U.S.C. § 120 as a continuation-in-part of U.S. patent application Ser. No. 15/395,682, filed Dec. 30, 2016. The contents of the foregoing applications are herein incorporated by reference in its entirety.

BACKGROUND

The present disclosure relates to content presentation. Content can be provided to client computing devices in electronic form in various formats. A user of the client computing device can terminate the presentation of the content prematurely at a point prior to the end of the content. The transmission of content to a client device, which is eventually not presented by the client computing device, can waste bandwidth and client computing resources.

SUMMARY

According to one aspect of the disclosure, a system for the transmission of packetized data in a voice activated data packet based computer network environment includes a data processing system. The data processing system can include a processor and a memory. The data processing system can receive, via an interface, data packets that include an input audio signal detected by a sensor of a client computing device. The data processing system can identify a first request within the input audio signal detected by the sensor of the client computing device. The data processing system can identify a content segment to fulfill the first request. The content segment comprising one or more elements. The data processing system can determine a predicted exposure interval for the content segment based on the one or more elements. The data processing system can select a first content item to place in the content segment. The first content item can include a time based display parameter. The data processing system can select a second content item to place in the content segment. The second content item can include a non-time based display parameter. The data processing system can determine a first utility of the first content item based on the time based display parameter and the expected exposure interval. The data processing system can determine a second utility of the second content item based on the non-time based display parameter. The data processing system can transmit, responsive to determining the first utility is greater than the second utility, data packets to the client computing device. The data packets can include an output signal containing the first content item.

According to another aspect of the disclosure, a method for the transmission of packetized data in a voice activated data packet based computer network environment can include receiving, via an interface, data packets that can include an input audio signal detected by a sensor of a client computing device. The method can include identifying a first request within the input audio signal detected by the sensor of the client computing device. The method can include identifying a content segment to fulfill the first request. The content segment can include one or more elements. The method can include determining a predicted exposure interval for the content segment based on the one or more elements. The method can include selecting a first content item to place in the content segment. The first content item can include a time based display parameter. The method can include selecting a second content item to place in the content segment. The second content item can include a non-time based display parameter. The method can include determining a first utility of the first content item based on the time based display parameter and the expected exposure interval. The method can include determining a second utility of the second content item based on the non-time based display parameter. The method can include transmitting, responsive to determining the first utility is greater than the second utility, data packets to the client computing device. The data packets can include an output signal containing the first content item.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
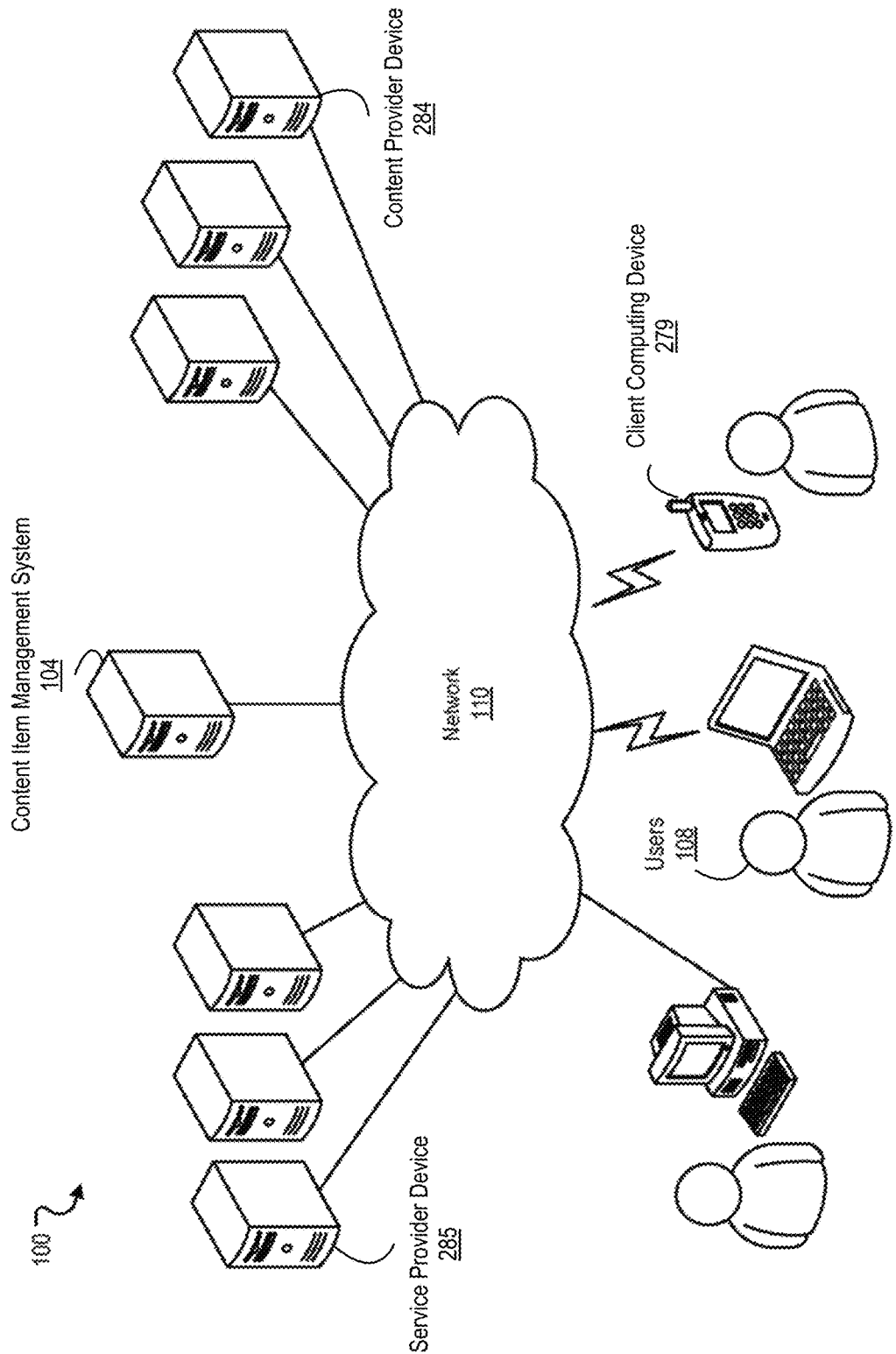
FIG. 1 is a diagram of an example content presentation system.

Systems and methods of the present disclosure relate generally to a data processing system that optimizes or dynamically content items for transmission to client computing devices. The data processing system can improve the efficiency and effectiveness of data packet transmission over one or more computer networks by, for example, dynamically selecting content items from a plurality of content items for transmission to a client computing device. The systems and methods described herein can include a data processing system that receives an input audio query. From the input audio query the data processing system can identify a request and a trigger keyword corresponding to the request. Based on the trigger keyword or the request, the data processing system can determine a thread that indicates a plurality of sequence dependent operations. For example, the thread can indicate a first action, a second action that is subsequent to the first action, and a third action that is subsequent to the second action. The actions can be completed over a period of time. The content items that are transmitted to the client computing device in response to each of the actions take a predetermined amount of time to present via the client computing device. For example, the content item can be a content item describing the weather that takes 30 seconds to play form beginning to end. The content items that are transmitted to the client computing device in response to the actions can have predicted exposure intervals. The exposure interval can a period of time that a content segment is predicted to be exposed to a user in response to actions. The content items can be inserted into the content segment. The system can reduce network bandwidth utilization by selecting content items that substantially match the predicted exposure interval of the content segments. Matching the content item length to the predicted exposure length can reduce network bandwidth utilization by not transmitting content items to the client computing device with a low probability of presentation.

Systems and methods of the present disclosure relate generally to a data processing system that optimizes or dynamically adjusts an order of processing sequence dependent operations via data packet based transmissions in a voice activated computer network environment. The data processing system can improve the efficiency and effectiveness of data packet transmission over one or more computer networks by, for example, asynchronously, out-of-sequence, or dynamically selecting operations from a plurality of sequence dependent operations. Data packets or other protocol based signals corresponding to the selected operations can be routed through a computer network between multiple computing devices. The data processing system can temporarily or permanently skip initial operations of a set of sequence dependent operations and can instead proceed to an operation that corresponds to a later-in-time or final operation. By bypassing packet or other protocol based data transmissions that correspond to an early operation of a plurality of sequence dependent operations, and instead proceeding directly to packet based data transmissions for later stage operations in a sequence of operations the data processing system can reduce, delay, or eliminate data processing associated with the early stage operations. This saves processing power and other computing resources such as memory, reduces electrical power consumption by the data processing system and the reduced data transmissions via the computer network reduces bandwidth requirements and usage of the data processing system.

The systems and methods described herein can include a data processing system that receives an input audio query. From the input audio query the data processing system can identify a request and a trigger keyword corresponding to the request. Based on the trigger keyword or the request, the data processing system can determine a thread that indicates a plurality of sequence dependent operations. For example, the thread can indicate a first action, a second action that is subsequent to the first action, and a third action that is subsequent to the second action. The third action, which in this example is the last action in a thread of sequence dependent operations, can be used by the data processing system to select a content item prior to occurrence of the first action and prior to occurrence of the second action. This can be done before or without performing at least some of the data processing operations based on the first action or the second action. Bypassing these processing operations causes the content item for the third action to be selected with less data processing and less electrical power usage than would be the case without the bypass.

The content item can include an output signal. The data processing system can provide the content item including the output signal by packet or other protocol based data message transmission via a computer network to a client computing device. The output signal can cause an audio driver component of the client computing device to generate an acoustic wave, e.g., an audio output, which can be output from the client computing device. The audio output corresponds to the third (e.g., last or latest in time) action and can by output from the client computing device prior to occurrence of the first action or prior to occurrence of the second action. The bypassing of the first and second actions (or the bypassing of selecting and providing content items corresponding to these actions) to first select and send the content item corresponding to the third action prior to occurrence of the first and second sequence dependent actions results in fewer data processing operations, less memory usage, and less network bandwidth utilization than would be the case without the bypass.

By way of overview and introduction, content items (also referred to as content items in some embodiments) associated with various bid types can be deployed across content segments (such as webpages or portions thereof) in a manner that improves or optimizes the revenue such content items (and their associated bids) generate for the content publishers on whose webpages the content items are presented. Among such bid types are bids which are monetized as a function of the time (e.g., per second, per minute, etc.) that the associated content items are exposed to/viewable by website viewers/users.

Determinations of the content item (or content items) to deploy within a particular content segment or segments can be computed with reference to the associated bid type(s) and an exposure interval of the content segment (reflecting the amount of time the content segment is expected to be exposed to/viewable by a user). In certain implementations, the exposure interval can be further computed or refined with respect to a particular group or demographic. In processing an exposure interval with the bids associated with various content items, a determination of which content item is expected to generate a greatest amount of revenue within a particular content segment can be identified.

While reference will be made below to content item systems and processes, other forms of content including other forms of sponsored content can be managed and presented in accordance with the description below.

FIG. 1 is a block diagram showing an example content presentation system 100. In some implementations, one or more service provider device 285 can directly, or indirectly, enter, maintain, and log content item information in a content item management system 104. Though reference is made to content items, other forms of content, including other forms of sponsored content, can be delivered by the system 100. The content items (e.g., digital components) can be in the form of graphical content items, such as banner content items, text-only content items, image content items, audio content items, video content items, content items combining one or more of any of such components, etc. The content items/digital components can also include embedded information, such as links, meta-information, and/or machine executable instructions. The content item can be a digital component. In some implementations, the content presentation system 100 can present digital components. A digital component can include one or more content items or can be a content item.

One or more content provider device 284 can submit requests for content items to the content item management system 104. The content item management system 104 responds by sending content items to the requesting content provider device 106 for placement on, or association with, one or more of the publisher's content items (e.g., web properties). Example web properties can include web pages, television and radio content item, content item, or digital content slots, or print media space.

Other entities, such as users 108 and the service providers (e.g. advertisers), can provide usage information to the content item management system 104, such as, for example, whether or not a conversion (e.g., a purchase or other interaction including, for example, a request for driving directions to a location associated with a content item, navigating to the location associated with the content item, or walking to the location associated with the content item) or a click-through related to a content item (e.g., a user has selected a content item) has occurred. This usage information can include measured or observed user behavior related to content items that have been served. In some cases, a user may opt in or opt out of allowing user behavior to be recorded, measured, or observed. In some cases, identifiers associated with each user may be anonymized so that the identity of each user is not provided to the content provider. The content item management system 104 can perform financial transactions, for example, crediting the content provider device 284 and charging the service provider device 285 based on the usage information.

A network 110, such as a local area network (LAN), wide area network (WAN), the Internet, one or more telephony networks or a combination thereof, connects the service provider device 285, the content item management system 104, the content provider device 284, and the users 108.

One example content provider device 284 is a general content server that receives requests for content (e.g., articles, discussion threads, music, video, graphics, search results, web page listings, information feeds, ad, etc.), and retrieves the requested content in response to the request. The convent provider device 284 can also be referred to as a publisher or publisher device. The content server can submit a request for content such as content items to a content server such as a content item server in the content item management system 104. The content item request can include a number of content items desired. The content item request can also include content request information. This information can include the content itself (e.g., page, video broadcast, radio show, or other type of content), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, the content server or a client browser can combine the requested content with one or more of the content items provided by the content item management system 104. The combined content and content items can be sent/rendered to the users 108 that requested the content for presentation in a viewer (e.g., a browser or other content display system). The content server can transmit information about the content items back to the content server, including information describing how, when, and/or where the content items are to be rendered (e.g., in HTML or JavaScript™)

Another example content provider device 284 is a search service. A search service can receive queries for search results. In response, the search service can retrieve relevant search results from an index of documents (e.g., from an index of web pages). Search results can include, for example, lists of web page titles, snippets of text extracted from those web pages, and hypertext links to those web pages, and can be grouped into a predetermined number of (e.g., ten) search results.

The search service can submit a request for content items to the content item management system 104. The request can include a number of content items desired. This number can depend on the search results, the amount of screen or page space occupied by the search results, the size and shape of the content items, and/or a variety of other factors. In some implementations, the number of desired content items will be from one to ten, or from three to five. The request for content items can also include the query (as entered or parsed), information based on the query (such as geo-location information, whether the query came from an affiliate and an identifier of such an affiliate), and/or information associated with, or based on, the search results. Such information can include, for example, identifiers related to the search results (e.g., document identifiers or "docIDs"), scores related to the search results (e.g., information retrieval ("IR") scores), snippets of text extracted from identified documents (e.g., web pages), full text of identified documents, feature vectors of identified documents, etc. In some implementations, IR scores can be computed from, for example, dot products of feature vectors corresponding to a query and a document, page rank scores, and/or combinations of IR scores and page rank scores, etc.

In some implementations, the content item management system 104 includes an auction process to select content items from the service provider device 285. For example, the service provider device 285 can be permitted to select, or bid, an amount the service providers are willing to pay for each presentation of or interaction with (e.g., click of) a content item, e.g., a cost-per-click amount an service provider pays when, for example, a user clicks on a content item. The cost-per-click can include a maximum cost-per-click, e.g., the maximum amount the service provider is willing to pay for each click of a content item based on a keyword, e.g., a word or words in a query. Other bid types, however, can also be used. Based on these bids, content items can be selected and ranked for presentation.

The search service can combine the search results with one or more of the content items provided by the content item management system 104. This combined information can then be forwarded to the users 108 that requested the content. The search results can be maintained as distinct from the content items, so as not to confuse the user between paid content items and presumably neutral search results.

In some implementations, one or more content provider device 284 can submit requests for content items to the content item management system 104. The content item management system 104 responds by sending content items to the requesting content provider device 106 for placement on one or more of the publisher's web properties (e.g., websites and other network-distributed content) that are relevant to the web property. For example, if a content provider device 284 publishes a sports-related web site, the content item management system can provide sports-related content items to the content provider device 284. In some implementations, the requests can instead be executed by devices associated with the user 108, e.g., by the execution of a particular script when the publisher's web page is loading on a client device.

In some alternative implementations, a content item push model is used to provide content items from service provider device 285. In a content item push model, content items can be pushed to idle screens (e.g., of a mobile devices or particular applications) based on particular criteria (e.g., the user's location).

In another example content provider device 284 is a mobile application developer. A mobile application is an application specifically designed for operation on a mobile device (e.g., a smart phone). The mobile application can also include content items positioned within the content of the mobile application. Similar to content provider device 284, the content items can be received from the content item management system 104 for placement in the mobile application when accessed by a user (e.g., when a particular page of a mobile application is loaded on the mobile device).

Figure 2A:
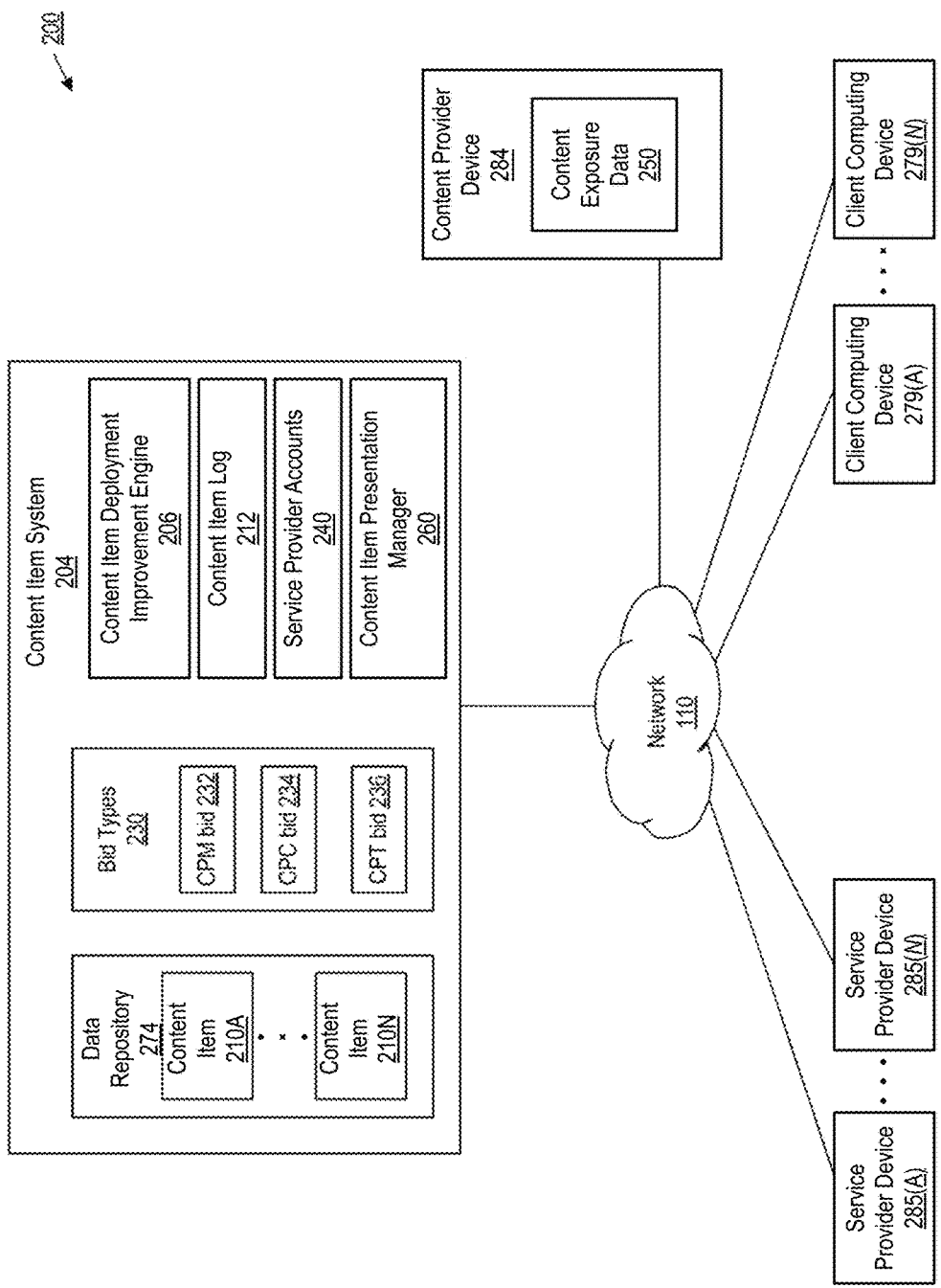
FIG. 2A is a block diagram of an example system for improved content item deployment.

FIG. 2A is a block diagram of an example system 200 for improved content item deployment. In the system 200, a service provider device 285A-285N (referred to collectively as service provider device 285) can submit one or more content items 210A-210N (also known as "creatives") (referred to collectively as content items 210) to a content item system 204, and such content items 210 are stored in a content item repository 202. Each content item (e.g., content item 210A) can include one or more words, phrases, web links, and/or any other such element and/or component (e.g., images, video, audio, etc.) that are provided to one or more users 108 (e.g., banner content items, text-only content items, image content items, audio content items, video content items, etc.). In certain implementations, one or more keywords (not shown) are associated with one or more creatives in order to enable the identification and selection of pertinent content items for display to a user based on one or more search queries received from the user. It should also be noted that although content items 210 are described herein as referring to individual content items, in certain implementations content items 210 can refer to groups of content items, such as content item groups, campaigns, and/or categories.

Content item system 204 can also include a content item presentation manager 260. The content item presentation manager 260 can identify content items in the content item repository 202 to present to a user 108, for example based on various criteria such as keywords in a search query, web page content, context, location, content item financials (e.g., cost per impression). For example, content item presentation manager 260 can identify one or more content items 210 associated with one or more keywords that are similar and/or identical to the search query provided by the user, and such creatives can be provided to the user in any number of content item formats. It should be understood that in some implementations, the content item system 204 can interact with a search system, for example presenting content items alongside search results. In some implementations, the content item system 204 can interact with content publishers, for example, providing content items to publishers or users for presentation along with web content, e-mail, or other content.

Content item system 204 can also include one or more content item logs 212. Content item log 212 can track and store one or more performance metrics that reflect the performance or success of a particular content item. For example, for a given content item, content item log 212 can track the 'click through rate,' reflecting the percentage of users presented with a creative that click on or otherwise select the presented content, though it should be understood that any number of other performance metrics can be similarly tracked (e.g., conversion rate), as is known to those of ordinary skill in the art.

Additionally, content item system 204 can include a content item deployment improvement engine 206. The content item deployment improvement engine 206 can process a content segment such as a webpage, in order to determine one or more content items to be deployed within the content segment. It should be understood that content item deployment improvement engine 206 can process any number of elements and/or components of various content items, content segments, publishers, service providers, users, and/or bid types, in order to compute and/or generate such determinations. It should also be understood that in some implementations, the content item deployment improvement engine 206 can include one or more processors configured by code to implement the functionality of the content item deployment improvement engine that is being described.

Content item system 204 can also include one or more bid types 230. In certain implementations, a particular bid type can reflect one or more ways or methods in which an service provider device 285 can elect to provide to an content auction, and subsequently to pay for the serving of a particular content item 210 by content item system 204. Examples of such bid types 230 include: cost per impression (referred to herein as "CPM") bid 232, whereby an service provider bids a specified amount for an instance of display/serving of a content item to a user 108 (irrespective of the length of time that the content item is viewable and/or any subsequent interaction with the content item), cost per click (referred to herein as "CPC") bid 234, whereby an service provider bids a specified amount for an instance of user interaction with the content item, such as a click by the user on the content item, and/or cost per time unit (referred to herein as "CPT") bid 236, whereby an service provider bids a specified amount per time unit (such as seconds, minutes, etc.) that a content item is displayed to and/or viewable by a user. It should be understood that bid types 232-236 are merely exemplary, and that other content item bid types can be similarly employed, such as bids based on conversion rates, as are known to those or ordinary skill in the art. Additionally, it should be understood that in some implementations, bid types 230 can be associated with one or more content items 210. For example, content item 210A can be associated with a particular CPM bid 232 (e.g., a bid to pay up to $0.02 per impression) while content item 210N can be associated with a particular CPT bid 236 (e.g., a bid to pay up to $0.005 per second). Moreover, it should be noted that bids such as CPM bids and CPC bids can be characterized as being non-CPT bids, on account of the fact that their respective bids are not implemented as a function of time.

Content item system 204 can also include one or more service provider accounts 240. Each individual service provider account (not shown) corresponds to content funds associated with a particular service provider device 285. Funds are deducted from such accounts upon the successful serving of one or more content items on behalf of a particular service provider, such as in the manner described in detail herein.

As described above, one or more content provider device 284 can be in communication with content item system 204 through network 110. In certain implementations, content provider device 284 can maintain content exposure data 250 with respect to the content (e.g., one or more websites, webpages, blogs, media files, etc.) provided by the publisher, thought it should be understood that in other implementations such content exposure data 250 can be similarly maintained by another entity, such as content item system 204. Examples of content exposure data 250 include one or more metrics that reflect the time and/or degree that users 108 engage with the content provided by content provider device 284, such as particular areas, regions, and/or pages of a particular website.

Figure 2B:
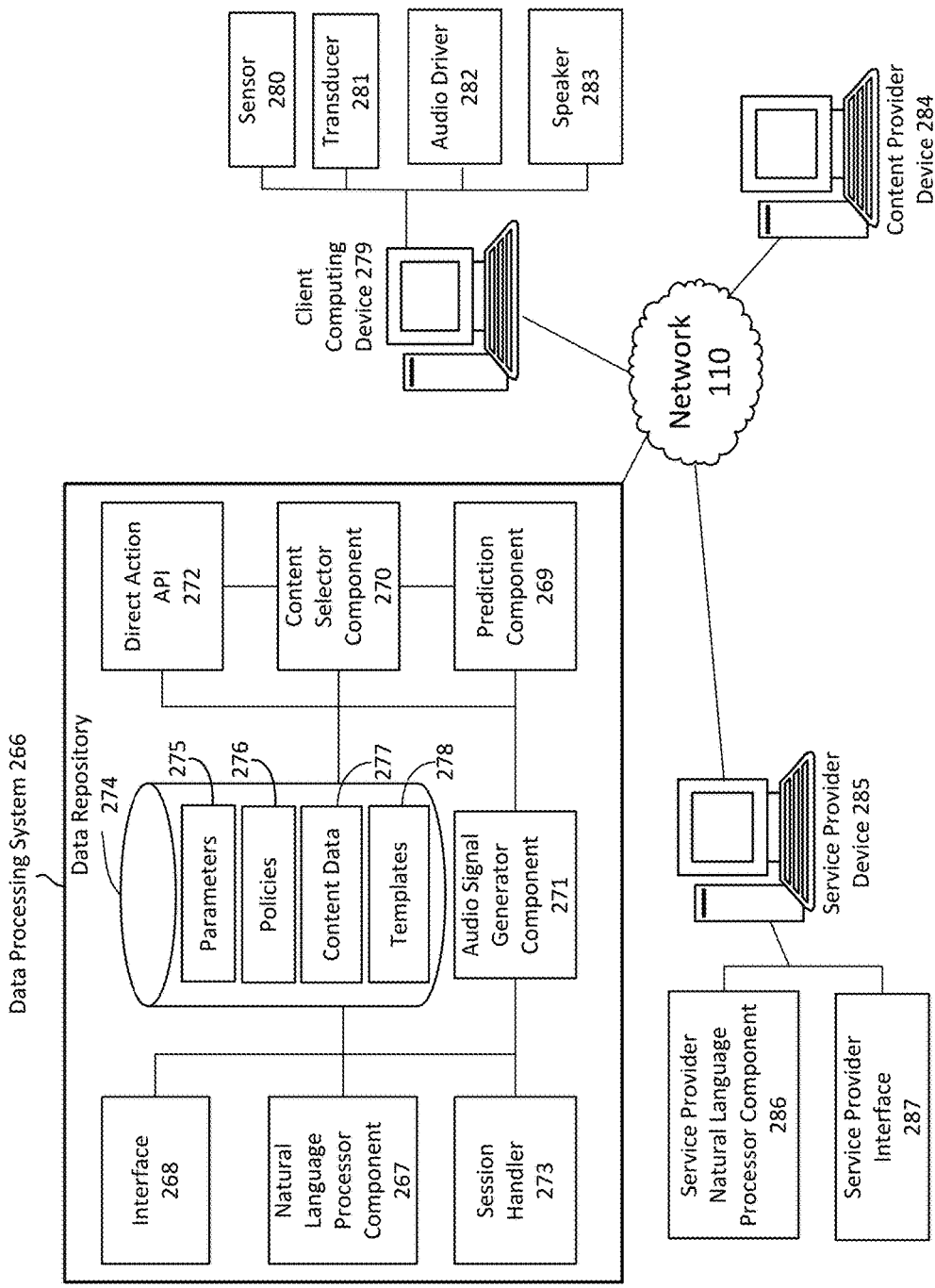
FIG. 2B depicts a system to optimize processing of sequence dependent operations in a voice activated computer network environment.

FIG. 2B depicts an example system to transmit packetized data in a voice activated data packet based computer network environment. The system can include at least one data processing system 266, which can be a component of the content item system 204 or the content item management system 104. In other implementations, the content item system 204 or the content item management system 104 can be a component of the data processing system 266. The data processing system 266 can include at least one server having at least one processor. For example, the data processing system 266 can include a plurality of servers located in at least one data center or server farm. The data processing system 266 can determine, from an audio input signal a request and a trigger keyword associated with the request. Based on the request and trigger keyword the data processing system 266 can determine or select a thread than includes a plurality of sequence dependent operations, and can select content items (and initiate other actions as described herein) in an order that does not match the sequence of dependent operations, for example as part of a voice activated communication or planning system. The content items can include one or more audio files that when rendered provide an audio output or acoustic wave. The content items can include other content (e.g., text, video, or image content) in addition to or instead of audio content. For example the content items can include text or image files, or combinations thereof, that do not include audio files and that do not render audio output.

The data processing system 266 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 266 can include servers in a data center that are stored in one or more high-density rack systems, along with associated storage systems, located for example in an enterprise data center. The data processing system 266 with consolidated servers in this way can improve system manageability, data security, the physical security of the system, and system performance by locating servers and high performance storage systems on localized high performance networks. Centralization of all or some of the data processing system 266 components, including servers and storage systems, and coupling them with advanced system management tools allows more efficient use of server resources, which saves power and processing requirements and reduces bandwidth usage.

The data processing system 266 can include at least one natural language processor (NLP) component 267, at least one interface 268, at least one prediction component 269, at least one content selector component 270, at least one audio signal generator component 271, at least one direct action application programming interface (API) 135, at least one session handler component 273, and at least one data repository 274. The NLP component 267, interface 268, prediction component 269, content selector component 270, audio signal generator component 271, direct action API 272, and session handler component 273 can each include at least one processing unit, server, virtual server, circuit, engine, agent, appliance, or other logic device such as programmable logic arrays configured to communicate with the data repository 274 and with other computing devices (e.g., the client computing device 279, the content provider computing device 284, or the service provider computing device 285) via the at least one computer network 110. The network 110 can include computer networks such as the internet, local, wide, metro or other area networks, intranets, satellite networks, other computer networks such as voice or data mobile phone communication networks, and combinations thereof.

The network 110 can include or constitute a display network, e.g., a subset of information resources available on the internet that are associated with a content placement or search engine results system, or that are eligible to include third party content items as part of a content item placement campaign. The network 110 can be used by the data processing system 266 to access information resources such as web pages, web sites, domain names, or uniform resource locators that can be presented, output, rendered, or displayed by the client computing device 279. For example, via the network 110 a user of the client computing device 279 can access information or data provided by the content provider computing device 284 or the service provider computing device 285. The client computing device 279 can be a computing device of the users 108.

The network 110 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 110 can include a wireless link, such as an infrared channel or satellite band. The topology of the network 110 may include a bus, star, or ring network topology. The network 110 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 279, the content provider computing device 284, and the service provider computing device 285 can each include at least one logic device such as a computing device having a processor to communicate with each other or with the data processing system 266 via the network 110. The client computing device 279, the content provider computing device 284, and the service provider computing device 285 can each include at least one server, processor or memory, or a plurality of computation resources or servers located in at least one data center. The client computing device 279, the content provider computing device 284, and the service provider computing device 285 can each include at least one computing device such as a desktop computer, laptop, tablet, personal digital assistant, smartphone, portable computer, server, thin client computer, virtual server, or other computing device.

The client computing device 279 can include at least one sensor 280, at least one transducer 281, at least one audio driver 282, and at least one speaker 283. In one example, the client computing device 279 can be the mobile computing device 750 described below in relation to FIG. 7. The sensor 280 can include a microphone or audio input sensor. The transducer 281 can convert the audio input into an electronic signal. The audio driver 282 can include a script or program executed by one or more processors of the client computing device 279 to control the sensor 280, the transducer 281 or the audio driver 282, among other components of the client computing device 279 to process audio input or provide audio output. The speaker 283 can transmit the audio output signal as an audible sound. In some implementations, the speaker 283 can also generate sub-audible signals to, for example, communicate with other devices.

The client computing device 279 can be associated with an end user (e.g., user 108) that enters voice queries as audio input into the client computing device 279 (via the sensor 280) and receives audio output in the form of a computer generated voice that can be provided from the data processing system 266 (or the content provider computing device 284 or the service provider computing device 285) to the client computing device 279, output from the speaker 283. The computer generated voice can include recordings from a real person or computer generated language.

The content provider computing device 284 can provide audio based content items for display by the client computing device 279 as an audio output content item. The content provider computing device 284 can be similar to the above-described content provider device 284. The content item provided by the content provider computing device 284 can include an offer for a good or service, such as a voice based message that states: "Would you like me to order you a taxi?" For example, the content provider computing device 284 can include memory to store a series of audio content items that can be provided in response to a voice based query. The content provider computing device 284 can also provide audio based content items (or other content items) to the data processing system 266 where they can be stored in the data repository 274. The data processing system 266 can select the audio content items and provide (or instruct the content provider computing device 284 to provide) the audio content items to the client computing device 279. The audio based content items can be exclusively audio or can be combined with text, image, or video data.

The service provider computing device 285 can include at least one service provider natural language processor (NLP) component 286 and at least one service provider interface 287. The service provider NLP component 286 (or other components such as a direct action API of the service provider computing device 285) can engage with the client computing device 279 (via the data processing system 266 or bypassing the data processing system 266) to create a back-and-forth real-time voice or audio based conversation (e.g., a session) between the client computing device 279 and the service provider computing device 285. For example, the service provider interface 287 can receive or provide data messages to the direct action API 272 of the data processing system 266. The service provider computing device 285 and the content provider computing device 284 can be associated with the same entity. For example, the content provider computing device 284 can create, store, or make available content items for a car sharing service, and the service provider computing device 285 can establish a session with the client computing device 279 to arrange for a delivery of a taxi or car of the car share service to pick up the end user of the client computing device 279. The data processing system 266, via the direct action API 272, the NLP component 267 or other components can also establish the session with the client computing device, including or bypassing the service provider computing device 285, to arrange for example for a delivery of a taxi or car of the car share service.

The data repository 274 can include one or more local or distributed databases, and can include a database management system. The data repository 274 can include computer data storage or memory and can store one or more parameters 275, one or more policies 276, content data 277, or templates 278 among other data. The parameters 275, policies 276, and templates 278 can include information such as rules about a voice based session between the client computing device 279 and the data processing system 266 (or the service provider computing device 285). The content data 277 can include content items for audio output or associated metadata, as well as input audio messages that can be part of one or more communication sessions with the client computing device 279.

The system 265 can optimize processing of sequence dependent operations in a voice activated data packet (or other protocol) environment. For example, the data processing system 266 can include or be part of a voice activated assistant service, voice command device, intelligent personal assistant, knowledge navigator, event planning, or other assistant program. The data processing system 266 can provide one or more instances of audio output for display from the client computing device 279 to accomplish tasks related to this input audio signal. The tasks can include, for example, communicating with the service provider computing device 285 or other third party computing devices to make dinner reservations or purchase movie tickets. For example, an end user can enter an input audio signal into the client computing device 279 of: "OK, I would like to go to go dinner and then a movie tonight."

The sequence dependent operations can include a number of actions that occur in a known, suggested, required, or particular order. For example, going from home to a movie theater, then back home can include three sequence dependent operations or actions. The first action in this example includes traveling from home to the movie theater. The second action includes watching the movie in the theater. The third action includes returning home from the theater. In this example, the second action in the sequence (watching the movie) is subsequent to and dependent on the first action (going out to dinner), and the third action (returning home) is subsequent to and dependent on the first action and the second action. The third action can be considered subsequent to and dependent on the second action, as having expressed an intent to do so, the data processing system 266 predicts that the end user would watch the movie in the theater before returning home as well.

The data processing system 266 can include an application, script or program installed at the client computing device 279, such as an app to communicate input audio signals to the interface 268 of the data processing system 266 and to drive components of the client computing device 266 to render output audio signals. The data processing system 266 can receive data packets or other signal that includes or identifies an audio input signal. For example, the data processing system 266 can execute or run the NLP component 267 to receive the audio input signal.

The NLP component 267 can convert the audio input signal into recognized text by comparing the input signal against a stored, representative set of audio waveforms (e.g., in the data repository 274) and choosing the closest matches. The representative waveforms are generated across a large set of users, and can be augmented with speech samples. After the audio signal is converted into recognized text, the NLP component 267 can match the text to words that are associated, for example via training across users or through manual specification, with actions that the data processing system 266 can serve.

The audio input signal can be detected by the sensor 280 (e.g., a microphone) of the client computing device. Via the transducer 281, the audio driver 282, or other components the client computing device 279 can provide the audio input signal to the data processing system 266 (e.g., via the network 110) where it can be received (e.g., by the interface 268) and provided to the NLP component 267 or stored in the data repository 274 as content data 277.

The NLP component 267 can obtain the input audio signal. From the input audio signal, the NLP component 267 can identify at least one request or at least one trigger keyword corresponding to the request. The request can indicate intent or subject matter of the input audio signal. The trigger keyword can indicate a type of action likely to be taken. For example, the NLP component 267 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The prediction component 269 (or other mechanism of the data processing system 266) can determine, based on the request or the trigger keyword, at least one thread associated with the input audio signal. The thread can indicate a set of sequence dependent operations, such as a series of actions. The thread can include any two or more actions, such as a first action, a second action, and a third action. For example, the input audio signal "OK, I would like to go to go dinner and then a movie tonight" can include at least one request indicating an interest to attend dinner and a movie, and at least one trigger keyword, e.g., "go" indicating a need for transportation. The prediction component 269 can identify a thread with at least three actions, such as a dinner action (first action), a movie action (second action), and a transportation home action (third action). In this example, from the request or the trigger keyword the prediction component 269 predicts, estimates, or otherwise determines the three actions. The thread can include other actions, such as an initial transport to dinner action.

The data processing system 266 or component thereof such as the prediction component 269 can determine that the actions of the thread are sequence dependent operations. For example, the prediction component can determine that the second action of watching the movie is subsequent to the first action of eating dinner, and that the third action of traveling home from the movie theater is after the second action of watching the movie. The prediction component 269 can access the parameters 275 or policies 276 in the data repository 274 to determine or otherwise estimate the order of the sequence dependent actions. For example, the parameters 275 or policies 276 could indicate that a transport action (e.g., a taxi home) can occur after an event action (e.g., watching a movie).

The prediction component 269 can determine a predicted exposure interval for the one or more actions of the thread or the thread itself. The prediction exposure interval can be based on the content item, content segments, and elements the content selector component 270 selects in response to the actions of the thread. The content selector component 270 is described further below, but briefly, the content selector component 270 can select content to provide to the client computing device 279. For example, the content item can include an audio message offering services of a car share company, responsive to an action in the thread that indicates a transportation need. The content selector component 270 can query the data repository 274 to select or otherwise identify the content item, e.g., from the content data 277. The content selector component 270 can also select the content item from the content provider computing device 284. For example, responsive to a query received from the data processing system 266, the content provider computing device 284 can provide a content item to the data processing system 266 (or component thereof) for eventual output by the client computing device 279. The content item can be a text based message that is displayed on a screen of the client computing device 279. For example, the content item can have a notification window that appears on the client computing device 279 that offers the services of a car share company in response to an action that indicates a transportation need.

The prediction component 269 can determine the exposure interval based on the length of the selected content segment or content items. In some implementations, the exposure interval can be based on the content items selected in response to a previous request similar to the current request. For example, the prediction component 269 can predict that a first request "OK, what is the news today" has a longer exposure interval than a second request "OK, what is 84 divided by 4." In this example, the response to the first request can include providing a first content segment that can include one or more elements and content items. The elements can include audio segments from different news agencies reporting on local, national, and world news. The response to the second request can include providing a content segment item that includes a single audio segment element stating "the answer is 21." The predicted exposure interval can be greater for the first request because the time to play each of these audio segments of the first content item is greater than the time to play the audio segment of the second content item.

The prediction component 269 can determine the predicted exposure interval based on characteristics of the request within an input signal. The characteristics can include the likelihood that request is to initiate a back-and-forth conversation. Another characteristic can include the likelihood that the request is to initiate related sessions.

For example, when the thread is part of a conversation (e.g., a session) between the client computing device 279 and the service provider computing device 285. The prediction component 269 can predict that input audio signals that are likely to initiate a back-and-forth conversation have a relatively high exposure interval. The conversation can include a back-and-forth voice or audio based conversation between the client computing device 279 and the service provider computing device 285. The conversation can include multiple threads. For example, an input audio signal of "OK, I would like to go to the movies tonight" can initiate a back-and-forth conversation as the system suggests different movies, movie times, restaurants, and restaurant times that are available to fulfill the input audio signal. The input response that is likely to generate a back-and-forth conversation can have a high exposure interval because multiple responses (and content items) are likely to be provided to the client computing device 279 in response to the initial input. The back-and-forth conversation can include single or multiple sessions.

In some implementations, the request can be associated a relatively high likelihood that related requests, initiating related sessions, will be received after the first request. The related sessions can be similar to a back-and-forth conversation, where each of the sessions includes one or more threads. The related sessions can be different than a single back-and-forth conversation in that one or more of the threads of the conversation can be separated from subsequent threads by an unrelated thread. For example, planning a vacation can include a plurality of related sessions. In this example, a first input request can ask for hotel availability in a vacation city. The related sessions could include threads such asking for the weather in the vacation city, making dinner reservations in the vacation city, or making other plans in the vacation city.

In some implementations, a content provider device 284 may desire for their content items to be provided in response to requests associated with greater predicted exposure intervals when compared to requests associated with shorter predicted exposure intervals. For example, when the predicted exposure interval is longer, there is an increased opportunity to the publisher to provide multiple content items. In the case where the content item is a content item, exposing a user to the content item multiple times can increase the probability that the content item will result in a conversion. As described herein, the selection of a content item can be made through an auction process. The content provider device 284 can set rules with the content item system 204 such that content provider device 284 automatically bids more for content items with relatively higher predicted exposure intervals.

The content selector component 270 can obtain indications of any of the actions of the thread. For example, the prediction component 269 can directly or indirectly (e.g., via the data repository 274) provide an indication of the third (or any other) action to the content selector component 270. The content selector component 270 can obtain this information from the data repository 274, where it can be stored as part of the content data 277. The indication of the third action can inform the content selector component 270 of a need for transportation from the location of the movie theater to a location as determined or indicated by the client computing device 279, such as a ride to an end destination.

The content selector component 270 can obtain indications of a later action in the thread prior to the occurrence of at least one earlier action. For example, the content selector component 270 can receive an indication of the third action (e.g., a need for a ride from the movie theater) before the movie plays in the theater (second action), or before the person who input the input audio signal into the client computing device 279 eats dinner at the restaurant (first action). The content selector component 270 can obtain indications of at least one action of the thread before completion of at least one action of the thread.

From the information received by the content selector component 270, e.g., an indication of the third action before occurrence of at least one prior action in the sequence dependent thread, the content selector component 270 can identify at least one content item. The content item can be responsive or related to the third action. For example, the content item can include an audio message offering services of a car share company, responsive to the third action that indicates a transportation need. The content selector component 270 can query the data repository 274 to select or otherwise identify the content item, e.g., from the content data 277. The content selector component 270 can also select the content item from the content provider computing device 284. For example responsive to a query received from the data processing system 266, the content provider computing device 284 can provide a content item to the data processing system 266 (or component thereof) for eventual output by the client computing device 279.

The audio signal generator component 271 can generate or otherwise obtain an output signal that includes the content item responsive to the third action. For example, the data processing system 266 can execute the audio signal generator component to generate or create an output signal corresponding to the content item. The interface 268 of the data processing system 266 can provide transmit one or more data packets that include the output signal via the computer network 110 to the client computing device 279. The interface 268 can be designed, configured, constructed, or operational to receive and transmit information using, for example, data packets. The interface 268 can receive and transmit information using one or more protocols, such as a network protocol. The interface 268 can include a hardware interface, software interface, wired interface, or wireless interface. The interface 268 can facilitate translating or formatting data from one format to another format. For example, the interface 268 can include an application programming interface that includes definitions for communicating between various components, such as software components of the system 265.

For example, the data processing system 266 can provide the output signal from the data repository 274 or from the audio signal generator component 271 to the client computing device 279. The data processing system 266 can also instruct, via data packet transmissions, the content provider computing device 284 or the service provider computing device 285 to provide the output signal to the client computing device 279. The output signal can be obtained, generated, transformed to or transmitted as one or more data packets (or other communications protocol) from the data processing system 266 (or other computing device) to the client computing device 279.

In this example the content selector component 270 skips to a later (e.g., third) action in a set of sequence dependent operations to select a content item for the third action prior to occurrence (and prior to an immediate need) for activity corresponding to the third action. By skipping to a later sequenced action, the data processing system 266 is not required to process information related to the first action or the second action to select content items for those actions. This reduces processor utilization, power consumption and bandwidth from data transmissions that would otherwise be associated with selecting a content item (for the first action) or a content item (for the second action) prior to selecting the content item for the third action.

The content selector component 270 can select the content item for the (subsequent or later) third action as part of a real-time content selection process. For example, the content item can be provided to the client computing device for transmission as audio output in a conversational manner in direct response to the input audio signal. The real-time content selection process to identify the content item and provide the content item to the client computing device 279 can occur within one minute or less from the time of the input audio signal and be considered real-time.

The output signal that corresponds to the content item, for example obtained or generated by the audio signal generator component 271 transmitted via the interface 268 and the computer network 110 to the client computing device 279, can cause the client computing device 279 to execute the audio driver 282 to drive the speaker 283 to generate an acoustic wave corresponding to the output signal. The acoustic wave can include words of or corresponding to the content item for the third action. The output signal that corresponds to the content item can also include non-audio content items that render on the client computing device 279 that is the source of the input audio signal or on a different client computing device 279 (e.g., a wearable device computing device) as text or image messages that can render without audio elements.

The acoustic wave can be output from the client computing device 279 before the occurrence of the first action or the second action. For example, the acoustic wave can include the audio output of "Would you like a taxi waiting for you after the movie?" In this example, the data processing system 266 obtains the input audio signal of, for example, "OK, I would like to go to go dinner and then a movie tonight." From this information the NLP component 267 identifies at least one request or at least one trigger keyword, and the prediction component 269 uses the request(s) or trigger keyword(s) to identify at least one thread. The thread includes a series of sequence dependent actions, e.g., a first dinner action, a second movie action, and a third transport home action. The prediction component 269 can determine (e.g., with at least a threshold level of confidence such as 75% confident) that these actions will occur in sequential order, where the end user of the client computing device 279 will first eat dinner, then after dinner go to a movie, then after dinner take transportation home or away from the movie theater. The content selector component 270 can, for example, bypass processing associated with content item selection for the first action and the second action and instead first selects a content item for the third action, e.g., a content item for a car share service to arrange for transport with a pick-up location of the movie theater. The data processing system 266 or component thereof such as the audio signal generator component 271 can provide the content item for the third action to the client computing device 279. The acoustic wave can be output from the client computing device 279 subsequent to the occurrence of the first action and before the occurrence of the second action, e.g., between prior actions in the thread.

The content item for the third item can render at least in part as an audio output from the client computing device 279 before the first action or the second action has occurred. For example, the output signal that includes the content item for the third action can render as a human or automated voice that states "Would you like a ride home from the movie theater?" The data processing system 266 can receive a response to the content item for the third action prior to occurrence of one, more than one, or all of the prior actions in the ordered sequence of actions. For example, the data processing system 266 can provide the content item for rendering and receive a response, e.g., via the interface 268, before the end user has gone to dinner or before the end user has watched the movie. The data processing system 266 can provide the output signal that includes the content item in direct or real-time response to the input audio signal of "OK, I would like to go to go dinner and then a movie tonight" so that the packet based data transmissions via the computer network 110 that are part of a communication session between the data processing system 266 and the client computing device 279 has the flow and feel of a real-time person to person conversation. This packet based data transmission communication session can also include the content provider computing device 284 or the service provider computing device 285.

The content selector component 270 can select content items provided in response to the third (or any non-first) action in the sequence dependent set of actions before selecting any content item for any prior action in the sequence. This avoids the need to process at least some of the data corresponding to the prior actions, which causes the third content item to be selected with a reduced number of processing operations than would occur if the content items were selected in an order that matches the order of the sequence of actions. Content items for the prior (e.g., first and second) actions may or may not be selected, for example after selection of the content item for the third action.

The content selector component 270 can select the content item (e.g., for the third action) based on at least one trigger keyword of the thread that indicates subject matter different than subject matter of the one or more requests of the same thread. For example, the requests of the thread responsive to "OK, I would like to go to go dinner and then a movie tonight" can indicate subject matter of a dinner request (first action), and subject matter of a movie request (second action). This subject matter does not indicate any transportation request. However, the NLP component 267 or the prediction component 269 (or other data processing system 266 components executing as part of the direct action API 272) can identify the trigger keyword "go" "go to" or "to go to" and can determine a transportation request (third action) based at least in part on the trigger keyword. Thus, the data processing system 266 can infer actions from the input audio signal that are secondary requests that are not the primary request or subject of the input audio signal.

The data processing system 266 can prevent or delay transmission of the output signal that includes the content item. For example, the interface 268 or a script executing via the direct action API 272 can prevent transmission of data packets that include the output signal corresponding to the content item until a triggering event. The triggering event can include expiration of a pre-determined time period, such as two hours or a time coinciding with occurrence of an earlier action in the thread, such as a scheduled end time of a movie. The triggering event can also include an authorization indication received by the data processing system 266 from the client computing device 279. The authorization indication can originate as a subsequent audio input associated with the thread but received by the data processing system subsequent to the input audio signal, a text-based or other non-audible signal, or can include an indication of a setting of the client computing device 279 that authorizes receipt by the client computing device 279 of content items.

The data processing system 266 can also delay transmission of the content item associated with a second or subsequent to second action of the thread to optimize processing utilization. For example, the data processing system 266 can delay content item transmission until an off-peak or non-peak period of data center usage, which results in more efficient utilization of the data center by reducing peak bandwidth usage, heat output or cooling requirements. The data processing system 266 can also initiate a conversion or other activity associated with the content item, such as ordering a car service, based on data center utilization rates or bandwidth metrics or requirements of the network 110 or of a data center that includes the data processing system 266.

The content items can correspond to the actions of the thread, and the content selector component 270 can select a content item for one, more than one, or all actions of the thread. The prediction component 269 can identify the sequence dependent thread of actions of, for example, "dinner" (first action) "movie" (second action) and "transport from movie location" (third action). The direct action API 272 can execute programs or scripts, for example from the NLP component 267, the prediction component 269, or the content selector component 270 to identify content items for one or more of these actions. The direct action API 272 can execute a specified action to satisfy the end user's intention, as determined by the data processing system 266. Depending on the action specified in its inputs, the direct action API 272 can execute code or a dialog script that identifies the parameters required to fulfill a user request. Such code can lookup additional information, e.g., in the data repository 274, such as the name of a home automation service, or it can provide audio output for rendering at the client computing device 279 to ask the end user questions such as the intended destination of a requested taxi. The direct action API 272 can determine necessary parameters and can package the information into an action data structure, which can then be sent to another component such as the content selector component 270 or to the service provider computing device 285 to be fulfilled.

The direct action API 272 of the data processing system 266 can generate, based on the request or the trigger keyword, data structures for the actions of the thread. The action data structures can be generated responsive to the request. The action data structure can be included in the messages that are transmitted to or received by the service provider computing device 285. Based on the request parsed by the NLP component 267, the direct action API 272 can determine to which of a plurality of service provider computing devices 285 the message should be sent. For example, if an input audio signal includes "order a taxi," the NLP component 267 can identify the trigger word "order" and the request for a taxi. The direct action API 272 can package the request into an action data structure for transmission as a message to a service provider computing device 285 of a taxi service. The message can also be passed to the content selector component 270. The action data structure can include information for completing the request. In this example, the information can include a pick up location and a destination location. The direct action API 272 can retrieve a template 278 from the repository 274 to determine which fields to include in the action data structure. The direct action API 272 can retrieve content from the repository 274 to obtain information for the fields of the data structure. The direct action API 272 can populate the fields from the template with that information to generate the data structure. The direct action API 272 can also populate the fields with data from the input audio signal. The templates 278 can be standardized for categories of service providers or can be standardized for specific service providers. For example, ride sharing service providers can use the following standardized template 278 to create the data structure: {client device identifier; authentication credentials; pickup location; destination location; no passengers; service level}.

For example the content item for the third action can be provided for rendering at the client computing device 279 as an audio response that states "Would you like a ride home from the movie theater?" in response to the audio input signal. Subsequent or prior to this rendering, the data processing system 266 can select or provide a content item, e.g., "the Italian restaurant downtown has an opening for 7 pm tonight?" for the first action (dinner), and can select or provide another content item, e.g., "would you like tickets to the 9 pm movie at the downtown theater?" for the second action (movie). The data processing system 266 can provide (which includes instructing the content provider computing device 284 to provide) these content items responsive to the input audio signal for rendering by the client computing device 279 as audio output content items. The data processing system 266, via the interface 268, can select or provide these content items in any order to the client computing device 279. For example, the content item for the third (e.g., last) action can be selected or provided first, before content items corresponding to other, earlier actions of the thread.

The data processing system 266 can receive a response to the content item "would you like a ride home from the movie theater?" The response can include an input audio signal, e.g., "yes please" that was entered into the client computing device 279 by the end user and received by the data processing system 266. Based on this response, the direct action API 272 can communicate with the service provider computing device 285 (that can be associated with the content item, such as a car share company) to order a taxi or ride share vehicle for the location of the movie theater at the time the movie ends. The data processing system 266 can obtain this location or time information as part of the data packet (or other protocol) based data message communication with the client computing device 279, from the data repository 274, or from other sources such as the service provider computing device 285 or the content provider computing device 284. Confirmation of this order (or other conversion) can be provided as an audio communication from the data processing system 266 to the client computing device 279 in the form of an output signal from the data processing system 266 that drives the client computing device 279 to render audio output such as, "great, you will have a car waiting for you at 11 pm outside the theater." The data processing system 266, via the direct action API 272, can communicate with the service provider computing device 285 to confirm the order for the car.

The data processing system 266 can obtain the response (e.g., "yes please") to the content item ("would you like a ride home from the movie theater?") and can route a packet based data message to the service provider NLP component 286 (or other component of the service provider computing device). This packet based data message can cause the service provider computing device 285 to effect a conversion, e.g., to make a car pick up reservation outside the movie theater. This conversion—or confirmed order—(or any other conversion of any other action of the thread) can occur prior to completion of one or more actions of the thread, such as prior to completion of the movie, as well as subsequent to completion of one or more actions of the thread, such as subsequent to dinner.

Based on a response to a content item for a subsequent action in the thread, such as the response "yes please" to the content item "would you like a ride home from the movie theater" for the third and last action in a sequence dependent thread, the data processing system 266 can initiate a conversion or action. This can occur before the end user has begun any activities associated with the thread, e.g., before dinner or before the movie is over. Processors of the data processing system 266 can invoke the direct action API 272 to execute scripts that order a car from a car share service.

The direct action API 272 can obtain content data 277 (or parameters 275 or policies 276) from the data repository 274, as well as data received with end user consent from the client computing device 279 to determine location, time, user accounts, logistical or other information in order to reserve a car from the car share service. Using the direct action API 272, the data processing system 266 can also communicate with the service provider computing device 285 to complete the conversion by in this example making the car share pick up reservation.

The direct action API 272 can initiate the conversion or activity to accomplish an action of the thread at any time during a time period from receipt by the data processing system 266 of the first input audio signal associated with the thread, (e.g., "OK, I would like to go to go dinner and then a movie tonight") until a threshold time period subsequent to completion of one of the actions of the thread, (e.g., until 15 minutes after the end of the second action of watching the movie). The data processing system 266 can also determine the end of this time period based on other factors, such as an indication that the end user has completed the actions of the thread, e.g., has returned home or is no longer located at the movie theater. The data processing system 266 can also obtain an indication from the client computing device 279 (a data message transmitted via the network 110) that the thread is canceled or dormant or that the end user has canceled or completed actions of the thread.

The direct action API 272 can initiate the conversion or activity to accomplish an action of the thread based on completion or time of completion of other actions of the thread. For example, the data processing system 266 can order a good or service (car share pick-up) directly or by communicating with the service provider computing device 285 within a threshold time period of a conclusion of a prior action in the thread. Within 5 minutes (or other time period) prior or subsequent to the scheduled or actual conclusion of the movie (second action), the data processing system 266 can confirm or order a car share service to send a car to pick up the end user at the movie theater (subsequent, third action). This can occur in the absence of input received from the end user computing device 279 during this time period, or responsive to a prompt received from the end user computing device 279 during this time period.

The direct action API 272 can initiate the conversions or other activity associated with the sequence dependent operations of the thread in any order. For example, the direct action API 272 (or other data processing system 266 component) can initiate activity corresponding to a final action (e.g., the third action in a three action thread such as ordering a taxi) prior to initiating activity corresponding to an earlier thread in the sequence, (e.g., prior to making a dinner reservation or prior to ordering movie tickets). In this example the data processing system 266 initiates activity for an earlier (e.g., second) action subsequent to initiation of activity for the later (e.g., third) action.

The content selector component 270 can identify, select, or obtain multiple content items resulting from a multiple content selection processes. The content selection processes can be real-time, e.g., part of the same conversation, communication session, or series of communications sessions between the data processing system 266 and the client computing device 279 that involve a thread. The conversation can include asynchronous communications separated from one another by a period of hours or days, for example. The conversation or communication session can last for a time period from receipt of the first input audio signal until an estimated or known conclusion of a final action of the thread, receipt by the data processing system 266 of an indication of a termination of the thread. This can be referred to as the active time period of the thread. For example, for a thread with three actions (e.g., dinner, move, and transport home), the content selector component 270 can select at least one content item for each action. The content selector component 270 can run or obtain results from a different content selection process for each action. In the content selection processes the content provider computing device 279 can set forth content items for selection by the content selector component 270. For a thread with at least three actions, the content item selector component can select or otherwise identify a first content item for the first action via a first content selection process, a second content item for the second action via a second content selection process, and a third content item for the third action via a third content selection process. The data processing system 266 that provides these content items for rendering by the client computing device 279 during the active time period of the thread can be considered to be operating in real-time. In this example the content selection processes and rendering of the content items occurs in real time.

The data processing system 266 can cancel actions associated with content items. For example, after ordering the car service the end user may watch the movie but then decide to walk home, or to have desert after the movie instead of taking a car home. An app or other program executing at the client computing device 279 as part of the data processing system 266 can receive an input audio signal of "cancel my ride home". The NLP component 267 can receive this input audio signal, for example as one or more packet based data messages, and can determine that this input audio signal relates to a pre-existing thread (e.g., dinner, movie, transport home) and is part of the same conversation or communication. For example, the NLP component 267 (or other data processing system 266 component) can evaluate time data, location data and pre-existing thread data such as past, present, or scheduled actions of a thread from the content data 277 of the data repository 274 to determine that an input audio signal relates to a pre-existing thread. Based, for example, on the request "ride" or the trigger keyword "cancel" the NLP component 267 can determine that the input audio signal "cancel my ride home" relates to the content item "would you like a ride home from the movie theater?" that corresponds to the third action of a pre-existing thread. The direct action API 272 (or other component) can cause the data processing system 266 to communicate via the interface 268 with the service provider computing device 285 to cancel the order for the taxi or car share service to have a car waiting for the end user outside the movie theater upon conclusion of the movie.

The NLP component 267 can receive the data packet or other protocol based message to cancel an action of the thread prior to or subsequent to completion of any action of the thread. The NLP component 267 can receive from the client computing device 279 (or obtain from the data repository 274) a data message (inbound audio signal) to cancel an action of the thread within a time interval triggered by an earlier action of the thread. For example, in a sequence dependent thread with three actions, dinner, movie, transport, the data processing system 266 can receive the transport cancellation data message within 5 minutes (or other time period) of the conclusion of the movie. The data processing system 266 can prompt for confirmation of a product or service related to an action of the thread. For example, during a time period between the first action and the second action (e.g., after dinner and before the movie)

the data processing system 266 can transmit a data message to the client computing device 279 that, when rendered at the client computing device 279 outputs the audio or text message stating "just confirming that you still want a car waiting for you after the movie." The data processing system 266 can receive a response, e.g., "yes, confirmed" or "no, cancel the car". The direct action API 272 can execute scripts to process this information and can communicate with the service provider computing device 285 to indicate the confirmation or the cancellation.

Figure 3A:
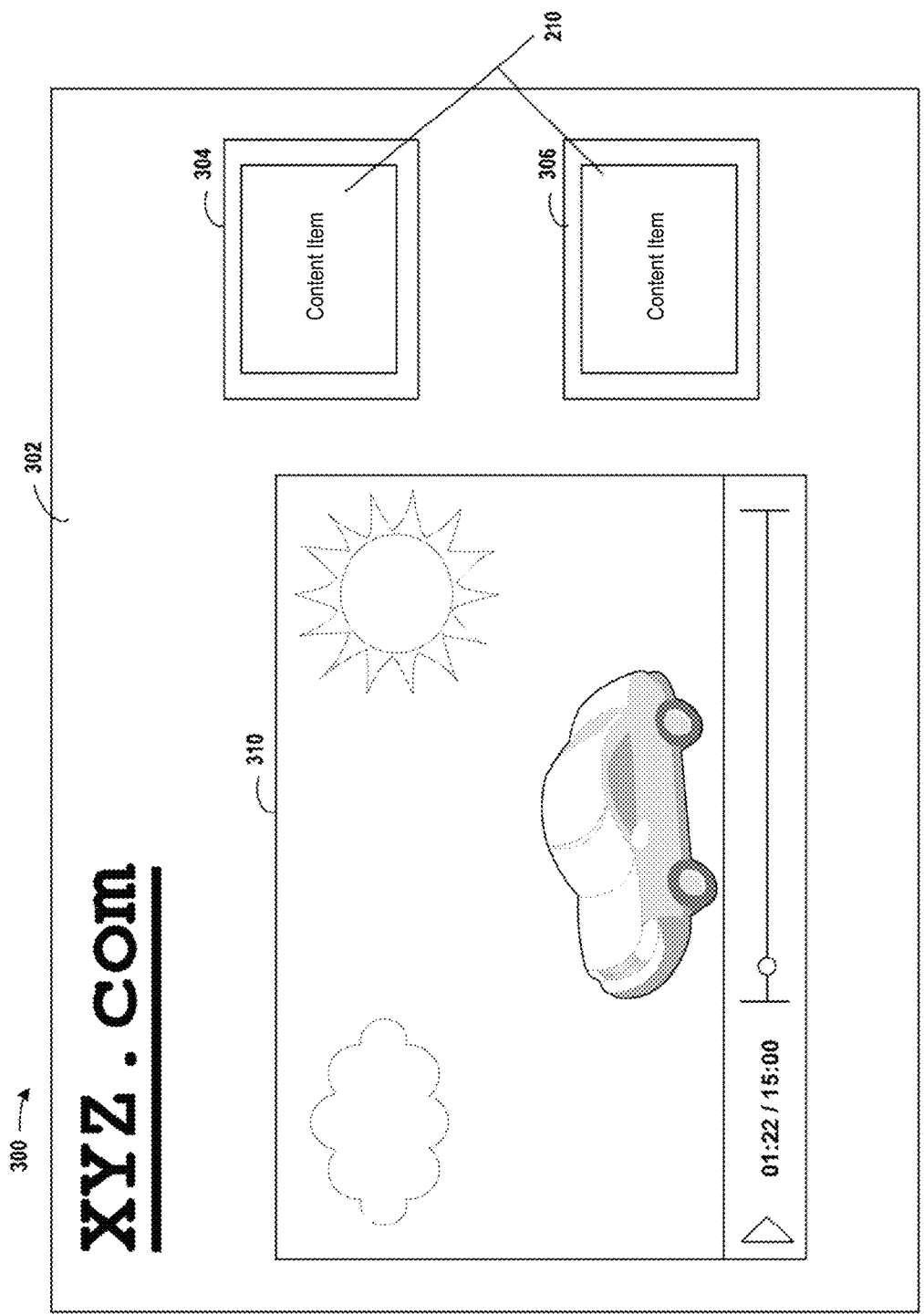
FIG. 3A is an exemplary screenshot reflecting an exemplary webpage.

Turning now to FIG. 3A, an exemplary screenshot 300 is provided, reflecting an exemplary webpage 302 provided by content provider device 284 to user 108. As can be appreciated with reference to FIG. 3A, the webpage 302 includes an embedded video 310 with a duration of 15 minutes, and two content item slots 304 and 306. Content item slots refer to areas within a webpage that are designated or reserved for the display of content items. It can be appreciated that content items 210 are deployed in the respective content item slots 304, 306.

Figure 3B:
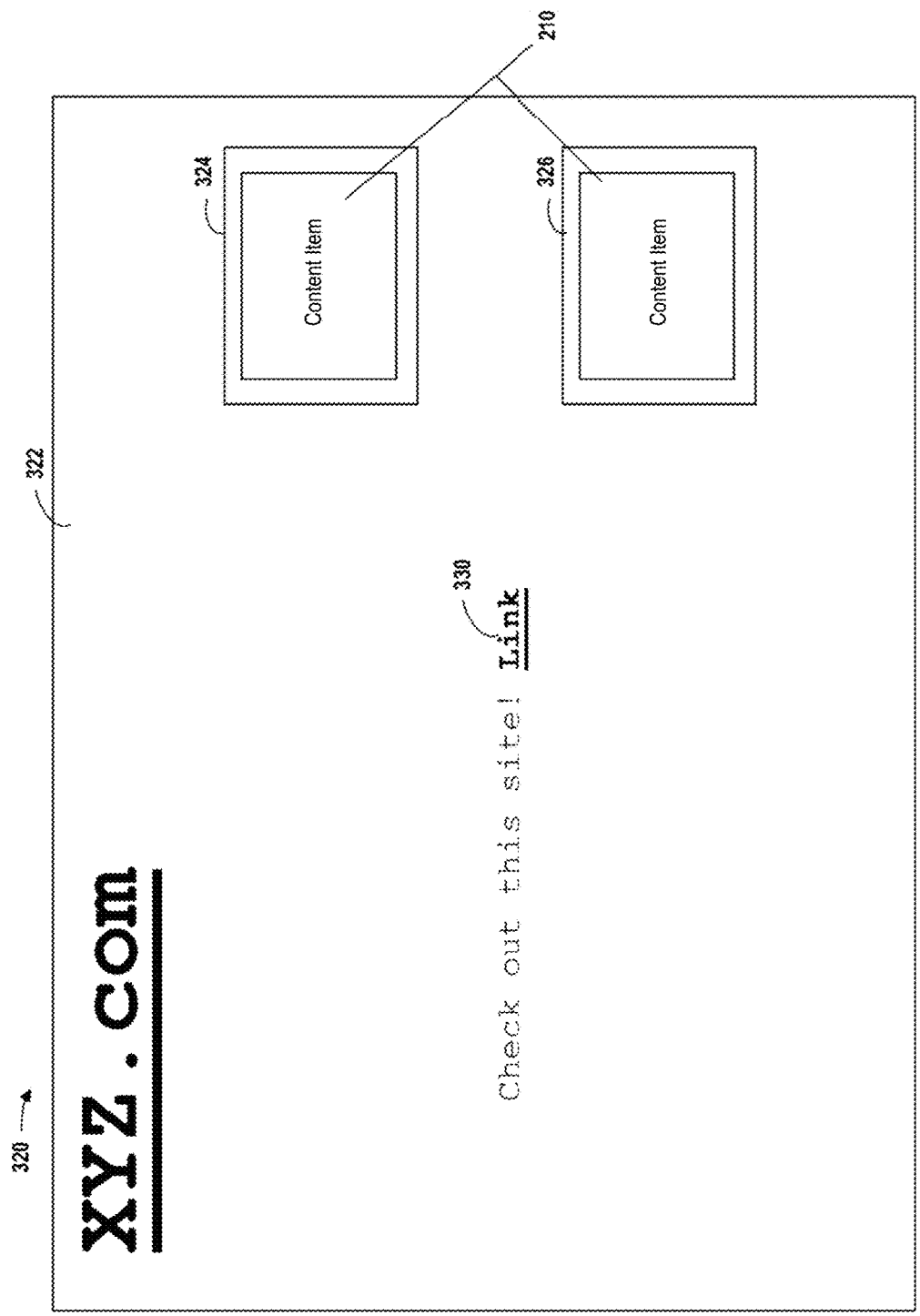
FIG. 3B is an exemplary screenshot reflecting another exemplary webpage.

FIG. 3B depicts an exemplary screenshot 320 of another exemplary webpage 322. This webpage provides a brief reference to a hyperlink 330 to another webpage, as well as two content item slots 324 and 326 within which content items 210 are respectively deployed. It can be appreciated that users 108, on average, are likely to spend relatively less time viewing the webpage shown in FIG. 3B (consisting primarily of a hyperlink to another site) than the webpage shown in FIG. 3A (consisting primarily of a 15 minute embedded video), and the results of this discrepancy can be reflected in the content exposure data 250 maintained for each respective page. It can be further appreciated that deploying content items associated with various bid types across the different webpages can serve to improve and/or optimize the content revenue generated by each webpage, as described in greater detail herein.

Figure 3C:
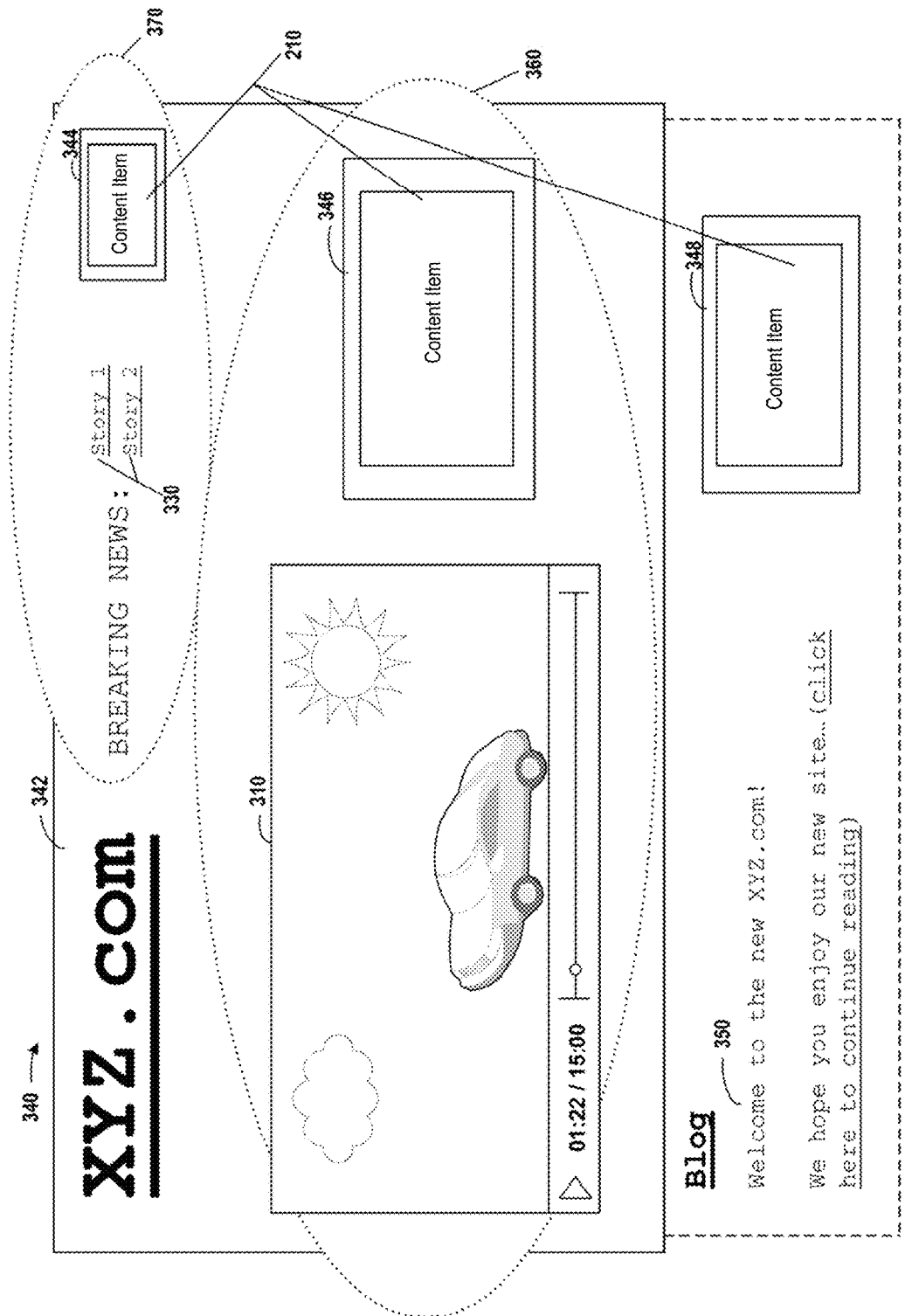
FIG. 3C is an exemplary screenshot reflecting yet another exemplary webpage.

FIG. 3C depicts an exemplary screenshot 340 of yet another exemplary webpage 342. It can be appreciated that only a portion of the webpage is viewable at any given time, as the content of the page extends beyond the area that the screen is capable of displaying. Accordingly, it can be appreciated that while content such as hyperlinks 330, embedded video 310, and some content items are viewable, other content such as blog 350 and content item 3 are not viewable without scrolling the page down. Moreover, as referenced above, it can be appreciated that certain content segments (e.g., embedded video 310) are likely to attract longer periods of user engagement than other content segments (e.g., hyperlinks 330). As such, deploying content items associated with different bid types in proximity to the respective content segments can serve to improve and/or optimize the content revenue generated by the page as a whole, as described in greater detail herein.

Figures 4A, 4B:
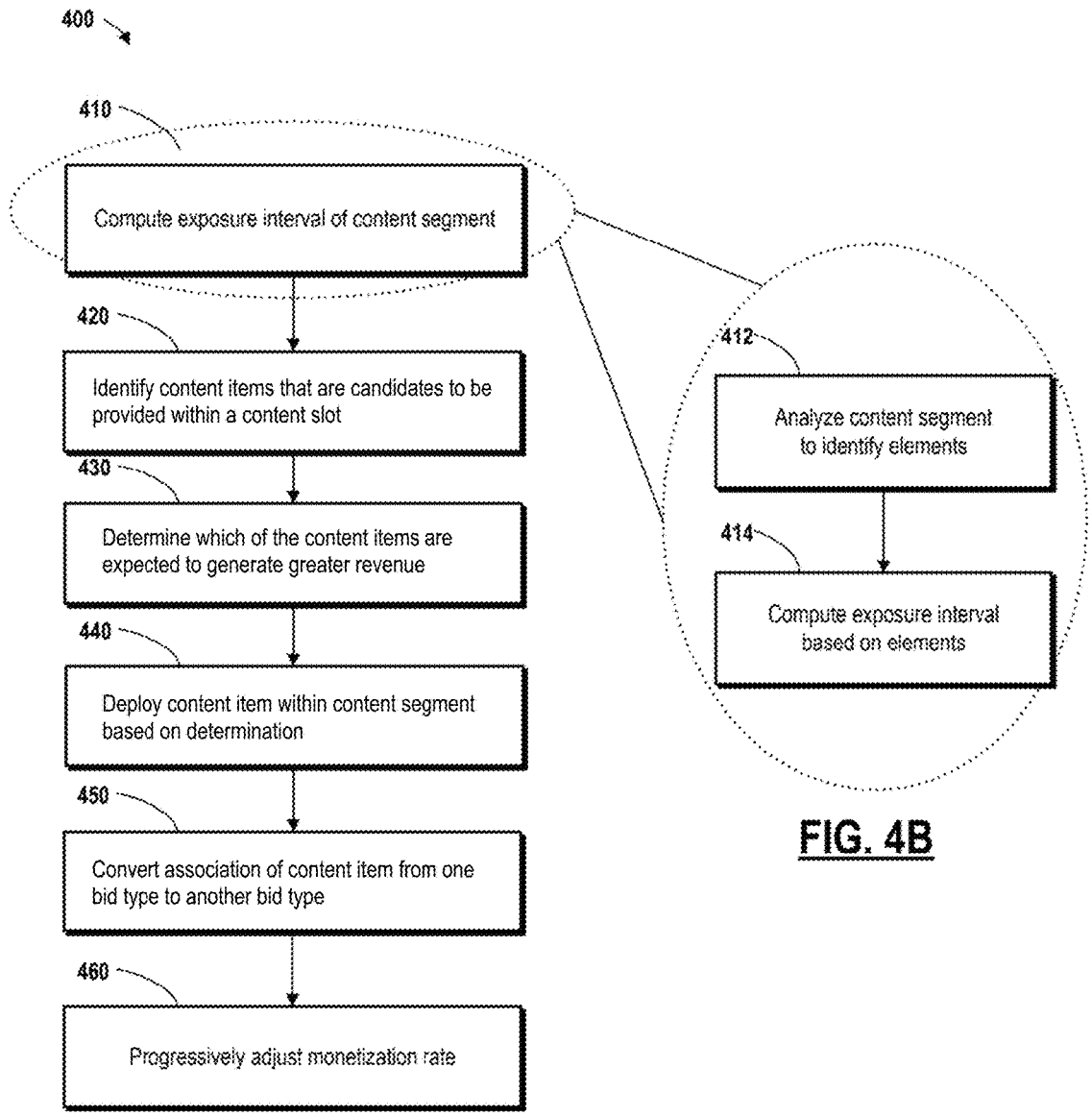
FIG. 4A is a flow chart of an example process for deploying content items.
FIG. 4B is a flow chart showing further aspects of an example process for computing an exposure interval of a content segment.

FIG. 4A is a flowchart of an example method 400 for deploying content items. In some implementations, the method 400 can be performed by a processor executing instructions in a computer-readable storage medium. For example, the method 400 can be performed by the content item system 204 of FIG. 2A.

An exposure interval of a content segment is computed (410). It should be understood that in certain implementations, such a content segment can be a webpage (e.g., the webpage 302 as depicted in FIG. 3A), while in other implementations the content segment can be a portion of a webpage (e.g., segment 360 in FIG. 3C, reflecting the portion of webpage 342 containing media/video content 310). By way of example, an exposure interval can be measured as a function of time, such as 15 seconds, five minutes, etc.

In order to compute an exposure interval of a content segment, in certain implementations, previous exposure instances (as contained/reflected, for example, in content exposure data 250) can be analyzed to determine an average exposure interval. Such previous exposure instances (corresponding to data such as 'time on page,' 'bounce rate,' and other such web traffic metrics that reflect aspects, such as duration, of a user engagement with a particular content segment such as a webpage and/or website, as are known to those of ordinary skill in the art), can be processed in order to compute an average exposure interval. It can thus be appreciated that the average exposure interval reflects an amount of time that users, on average, engage with and/or otherwise view a particular content segment (e.g., 15 seconds, five minutes, etc.).

At this juncture, it should be noted that in certain implementations, the referenced exposure interval/average exposure interval can be computed/refined with respect to one or more user profiles or user types. That is, it can be appreciated that users among a first demographic (e.g., between the ages of 18-25) can relate to various content segments differently than users among a second demographic (e.g., between the ages of 55-65). For example, users between the ages of 18-25 can, on average, spend more time engaging with video/media content as compared to text content, while users between the ages of 55-65 can, on average, spend more time engaging with text content as compared to video/media content. As such, it can be appreciated that a particular content segment (e.g., a content segment containing an embedded video) can have different exposure intervals/average exposure intervals for different user profiles/demographics. It should also be noted that in certain implementations, a user profile/demographic can be provided by a user (such as through user profile information composed/provided by the user), while in other implementations such a user profile/demographic can be generated based on user behavior that has been observed (though it should be understood that in some cases a user may opt in or opt out of such an observation, and in some cases, identifiers associated with each user may be anonymized, as referenced above).

Turning briefly to FIG. 4B, further aspects of the computing of an exposure interval of a content segment are shown. In certain implementations a content segment can be analyzed to identify one or more elements of the content segment (412). Examples of such elements include media content (such as an embedded video or audio file or stream), text content (such as a blog post or article), a hyperlink, and/or aspects of such elements. By way of illustration, the HTML code corresponding to/underlying a particular webpage (e.g., webpage 302 depicted in FIG. 3A) and/or a portion of a webpage (e.g., segment 360 in FIG. 3C) can be analyzed to identify elements (such as media/video content 310) within the webpage/portion thereof. Accordingly, it can be appreciated that in certain implementations, an exposure interval can be computed based on the one or more elements (414). That is, having identified media/video content 310 within a content segment (a webpage/portion of a webpage), an exposure interval can be computed on account of the presence of the media/video content 310 (content which generally increases an exposure interval of a content segment). It certain implementations, different elements of a content segment can be associated with fixed exposure intervals (e.g., media/video content is ascribed a five minute exposure interval, blog posts/articles are ascribed a two minute exposure interval, hyperlinks are ascribed a five second exposure interval, etc.), while in other implementations certain aspects of such elements can dictate/suggest a particular exposure interval to be ascribed to the pertinent content segment. For example, the finite duration of media/video content (e.g., 15 minutes, as shown in FIG. 3A), and or some function thereof (e.g., 50% of the total duration of the media/video content) can dictate/suggest the referenced exposure interval. By way of further example, the number of words in a blog post or article (e.g., blog 350 in FIG. 3C) can dictate/suggest the referenced exposure interval (e.g., each 50 words of a blog post/article is equivalent to one minute of an exposure interval). It can be appreciated that by computing an exposure interval based on elements of a content segment, a determination can be made regarding the exposure interval of the content segment, even in scenarios where there are no previous exposure instances (such as those referenced at 410) or in scenarios where such previous exposure instances are not statistically significant. Accordingly, such exposure intervals, such as those computed based on the various elements within a content segment, can be said to be projected exposure intervals, as they reflect a projected exposure interval that can be computed even in scenarios where little or no historical data exists and/or is available.

Returning to FIG. 4A, two or more content items (e.g., digital components) that are candidates to be provided within a content slot of the content segment can be identified (420). In certain implementations, one of the content items can be associated with a CPT bid and another of the content items can be associated with a non-CPT bid. For example, content item 210A can be associated with a particular CPM bid 232 (e.g., a bid to pay up to $0.02 per impression) while content item 210N can be associated with a particular CPT bid 236 (e.g., a bid to pay up to $0.005 per second).

A determination is made regarding whether the amount of revenue expected from providing one of the identified content items in a content slot is greater than the amount of revenue expected from providing another of the identified content items in the content slot (430). In certain implementations, such a determination is achieved using an amount of the CPT bid (e.g., the CPT bid referenced at 420), an amount of the non-CPT bid (e.g., the non-CPT bid referenced at 420), and the exposure interval (such as the exposure interval computed at 410). That is, as referenced herein, service provider device 285 can participate in an auction whereby the service providers can bid various monetary amounts, with the highest/winning bid (optionally in combination with the relevance of the particular content item, as referenced above) entitling the service provider to serve their content item to a user. For example, an auction process can yield a CPM bid of up to $0.05 per impression, a CPC bid of up to $0.15 for per click, and/or a CPT bid for up to $0.01/second. Each respective bid in the auction can be processed with an exposure interval (such as the exposure interval computed at 410) in order to determine which content item (and its associated bid) is likely to yield the most revenue. For example, in a content segment that has been determined to have an exposure interval of four seconds (such as webpage 322 depicted in FIG. 3B which contains a hyperlink), it can be appreciated that deploying a content item associated with a CPM bid yields $0.05 of content revenue for the publisher, while deploying a content item associated with a CPT bid yields $0.04 of content revenue ($0.01/second×4 seconds)—thus, a content item associated with a CPM bid is preferable to a content item associated with a CPT bid in such a content segment. Similarly, in a content segment that has been determined to have an exposure interval of six seconds, it can be appreciated that deploying a content item associated with a CPT bid yields $0.06 of content revenue ($0.01/second×6 seconds), while a content item associated with a CPM bid yields $0.05 of content revenue—thus, a content item associated with a CPT bid is preferable to a content item associated with a CPM bid under such circumstances. It should also be noted that content item associated with a CPC bid can also be accounted for (that is, considered with respect to determining the content item associated with a particular bid type to deploy within a particular content segment) by converting the CPC bid into an equivalent metric. This can be accomplished, for instance, by multiplying a CPC bid (e.g., $0.15) by a predicted/average click-through rate (CTR) (e.g., 6%), and further multiplying the result by the exposure interval (e.g., four seconds). Accordingly, it can be appreciated that for a content segment having an exposure interval of four seconds, a content item associated with a CPC bid of $0.15/click yields $0.036 of content revenue (0.15×0.06×4), while for a content segment having an exposure interval of six seconds, a content item associated with a CPC bid of $0.15/click yields $0.054 of content revenue (0.15×0.06×6).

Moreover, in certain implementations, the referenced associations of a particular content item with a particular bid type can include a distribution of one or more content items having various respective bid types (e.g., CPC, CPT, etc.) within one or more content segments. For example, with reference to FIG. 3C, it can be appreciated that content segment 360 (containing media/video content 310 and content item 2) can have a first exposure interval (e.g., six seconds), while a second content segment 370 (containing hyperlinks 330 and content item 1) within the same webpage 342 can have a second exposure interval (e.g., four seconds).

Following the example(s) outlined above, it can be appreciated that, with respect to content item slot 346 of content segment 360 (e.g., content item 2), a content item associated with a CPT bid is likely to yield the greatest amount of content revenue when deployed in this content item slot, while, with respect to content item slot 344 of content segment 370 (e.g., content item 1), a content item associated with a CPM content item is likely to yield the greatest amount of content revenue when deployed therein. Accordingly, it can be further appreciated that by distributing content items associated with CPT bids within content item slot 346 of content segment 360 and content items associated with CPM bids within content item slot 344 of content segment 370, content revenues can be maximized across the various content segments (when compared to a deployment content items associated only with CPM bids or content items associated only with CPT bids).

One or more content items are provided in one or more content slots (440). In certain implementations, the content items can be provided in response to a determination that a content item associated with one bid type is expected to generate a greater amount of revenue than a content item associated with another bid type (e.g., with respect to a particular content item slot included within a particular content segment), such as in the manner described at 430. Moreover, in certain implementations, the one or more content items can be provided/deployed within a content segment in a manner that optimizes projected revenues generated by the one or more content items, such as in the manner described above. The manner in which the content items are deployed can, in certain implementations, be based on an exposure interval, such as the exposure interval computed at 410.

It should also be noted that in certain implementations, providing/deploying content items within a content segment (e.g., within one or more content slots included within a particular content segment) can include providing a suggested arrangement of the content items within the content segment. For example, the publisher of website 342 (as depicted in FIG. 3C) can be presented with one or more suggestions of various arrangements of content items (and their respective associated bid types), such as those referenced above. The publisher can then choose to deploy such suggestions, edit/modify them, and/or reject them.

Additionally, in certain implementations, various content items can be provided/deployed in a manner that accounts for a user profile of the particular user to whom the content items are being deployed. That is, as referenced above at 410, it can be appreciated that users from different groups and/or demographics can have different interests and can interact with/view webpages and content items differently. As such, having identified a user as having a particular profile, content items can be deployed in a manner that accounts for such an identification (e.g., deploying content items having associated bid types in a manner that improves or optimizes revenue generation on account of observed or predicted tendencies about other members of the same group/demographic, such as exposure intervals with regard to various content segments, as described herein).

An association of one or more of the content items is selectively converted from one bid type to another bid type (450). That is, it can be appreciated that the particular content item objectives of a service provider can change and/or be dependent upon various budgetary considerations. Moreover, it can be further appreciated that certain bid types, such as CPT bids, can entail a degree of unpredictability with respect to the specific amount an service provider will be charged for a particular impression of a content item associated with such a bid (as this charge is ultimately determined by the actual amount of time during which a user is exposed to the content item). As such, upon reaching a certain budgetary threshold (e.g., an content account of an service provider falls below a certain threshold, such as a defined amount or a percentage of an original account balance) the association of one or more content items of a particular service provider can be converted from one bid type to another bid type. For example, once an content account of the service provider falls below a certain threshold the association of one or more content items of a particular service provider with CPT bids can be converted, such that the content items are associated instead with CPM bids. In converting the respective associations of such content items from CPT bids to CPM bids, an service provider can potentially increase the predictability of the number of content impressions that will be achieved with the remaining content account balance (in light of the fact that, in the case of an association with a CPT bid, longer impression periods will deplete the account balance sooner and provide fewer total impression instances). It should also be noted that such a conversion (e.g., converting the association of a particular content item from a CPT bid to a CPM bid) can be achieved using the principles referenced above (at 430) with respect to determining which content item is expected to generate the greatest amount of revenue on the basis of a particular bid associated with the content item and a computed exposure interval.

A monetization rate of a bid is progressively adjusted (460). That is, it can be appreciated that in a scenario where a content item associated with a cost per time unit (CPT) bid is deployed, the amount that the service provider ultimately pays for a particular instance of deployment of the content item is variable, depending on the amount of time that a user views/is exposed to the content item. It can also be appreciated that in many cases the utility/value of the viewing of the content item by the user diminishes as time goes on. As such, in some implementations the monetization rate (for example, the amount the service provider pays per time unit) of such CPT bids can be progressively adjusted as time goes on. For example, a CPT bid can be configured to charge a first rate (e.g., $0.01/second) for a first time period (e.g., the first 10 seconds of content item exposure) and a second rate (e.g., $0.005/second) for a second time period (e.g., the following 10 seconds). Moreover, in certain implementations a monetization cap can be imposed on a CPT bid, representing a maximum value that a service provider can be charged for a single impression (e.g., $0.20). In doing so, the service provider can be protected from significant charges in scenarios where a user maintains an instance of a page having a content item associated with a CPT bid for a lengthy period of time. It should be noted, however, that while the examples referenced above illustrate scenarios where a monetization rate of an bid decreases as time goes on, in other implementations the monetization rate can be optionally configured to increase as time goes on (e.g., in the case of a video content item where the ongoing viewing of the content item is of increasing value to the service provider).

It should also be noted that in certain implementations the monetization rate of a CPT bid can be progressively adjusted based elements of the content segment within which the associated content item is deployed. For example, in the case of a video content item, there can be certain points within the video that are of greater value/importance to the service provider than others (e.g., points where a particular product or feature is shown). It can be further appreciated that such points can be flagged or otherwise designated by the service provider, in a manner known to those of ordinary skill in the art. Accordingly, in certain implementations, certain points/segments of such a video content item can be monetized at one rate, while other points/segments of the same video can be monetized at a different rate, owing to the differences in importance/value between the various points/segments.

Additionally, in certain implementations, various content items can be configured to be monetized only if/when the content item is within view of a user. For example, it can be appreciated, with referenced to FIG. 3C, that Content item 3 is not immediately viewable to the user upon arrival at webpage 342. Indeed, in certain scenarios the user may never be exposed to Content item 3 (such as if the user leaves the site or otherwise remains idle without scrolling down). As such, if Content item 3 is associated with a CPT bid, the content item can be configured to charge the service provider only when Content item 3 is viewable to the user, such as when the user scrolls down webpage 342. If the user subsequently scrolls back up the page (thus re-obscuring Content item 3 from view), a timer (responsible for maintaining the exposure time for content items associated with CPT bids) can effectively pause until the content item returns to view. It should be understood that while the various examples are provided in relation to content items associated with CPT bids, such principles can be similarly applied to other content items, such as content items associated with CPM bids (e.g., an impression is only counted if the content item is actually within view of a user for some period of time).

Figure 5A:
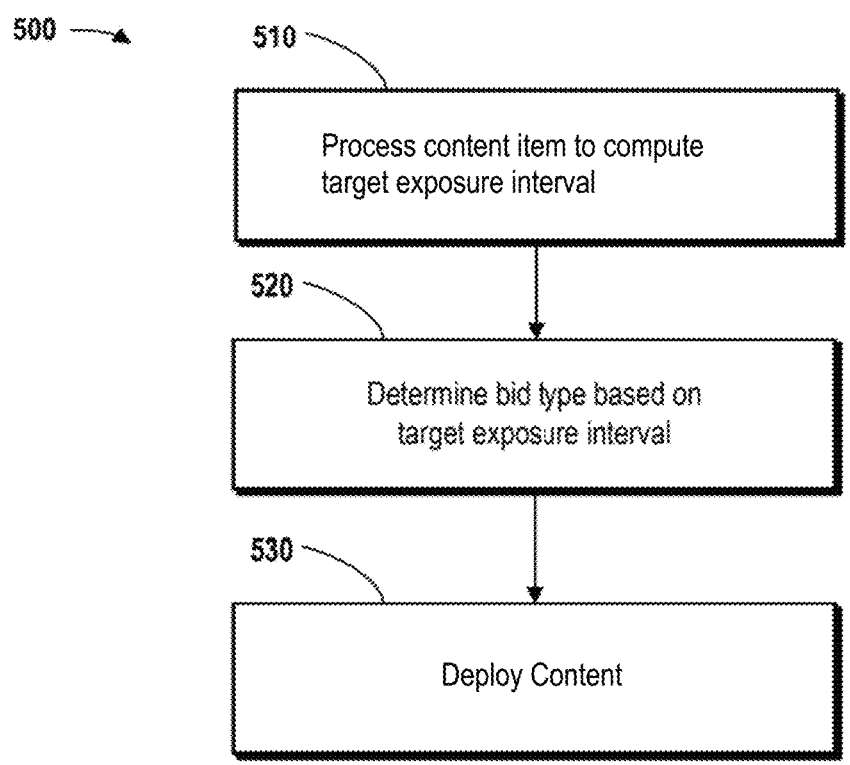
FIG. 5A is a flow chart of an example process setting a bid type.

FIG. 5A is a flowchart of an example method 500 for setting a bid type. In some implementations, the method 500 can be performed by a processor executing instructions in a computer-readable storage medium. For example, the method 500 can be performed by the content item system 204 of FIG. 2A.

Figure 6:
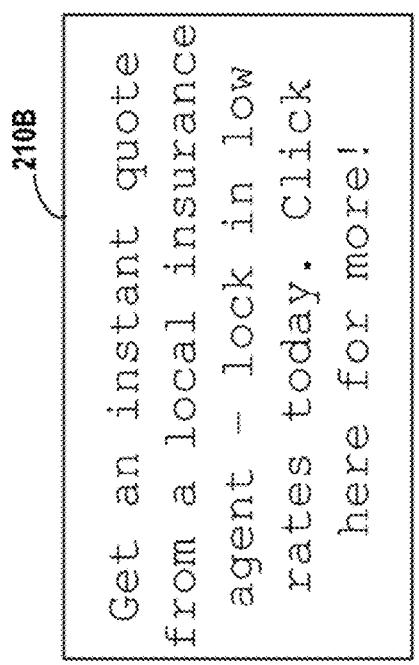
FIG. 6 depicts two exemplary content items.
Figure 6:
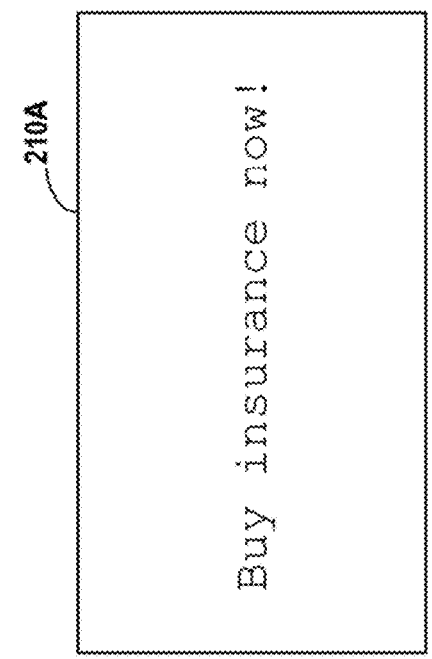

A content item can be processed to compute a target exposure interval (510). It should be understood that a target exposure interval is an ideal or desired time duration for the content item to be presented to/viewable by a user. In certain implementations, the content of one or more of the content items can be analyzed in order to compute a target exposure interval. For example, FIG. 6 depicts exemplary content items 210 and 210B. It can be appreciated, with reference to FIG. 6, that content item 210A ("Buy insurance now!") is considerably shorter (that is, contains fewer words) than content item 210B ("Get an instant quote . . . Click here for more!"). Accordingly, it can be further appreciated that the target exposure interval (that is, the ideal amount of time to display the content item) of content item 210A is likely to be significantly less than the target exposure interval of content item 210B (in light of content item 210A having relatively fewer words than content item 210B and thus requiring relatively less time for the content message to be imparted to a user viewing the content item). For example, in one implementation the content of a content item can be analyzed and the target exposure interval can be computed as a function of the number of words in a content item. By way of illustration, every three words in a content item can be defined to be equivalent to one second of a target exposure interval—thus, content item 210A of FIG. 6, having three words, would have a target exposure interval of one second, while content item 210B, having 18 words, would have a target exposure interval of six seconds. By way of further example, in certain implementations the content type of one or more of the content items can be analyzed/considered in order to compute a target exposure interval. For example certain types of content items (e.g., flash content items, interactive content items, etc.) which are intended to elicit relatively longer periods of user viewing/engagement (as compared to text content items, for instance) can be ascribed a certain target exposure interval, while other types of content items (e.g., text content items, banner content items, etc.) can be ascribed a relatively shorter target exposure interval.

A bid type for association with the at least one content item can be determined based on the target exposure interval (520). That is, having determined (such as at 510) the target exposure interval for a particular content item, the target exposure interval can be processed in a manner substantially similar to that described in detail above at 430, whereby various bid types can be processed with the target exposure interval in order to determine which bid type is likely to yield the most revenue when associated with a particular content item.

One or more content items can be deployed as within a webpage (530). In certain implementations, the content item can be deployed in response to a selection of the content item, such as on the basis of a bid type associated with the content item. That is, having determined a bid type to associated with a particular content item (such as at 520), the content item can be deployed to a user, substantially in the manner described in detail above at 440.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 5B:
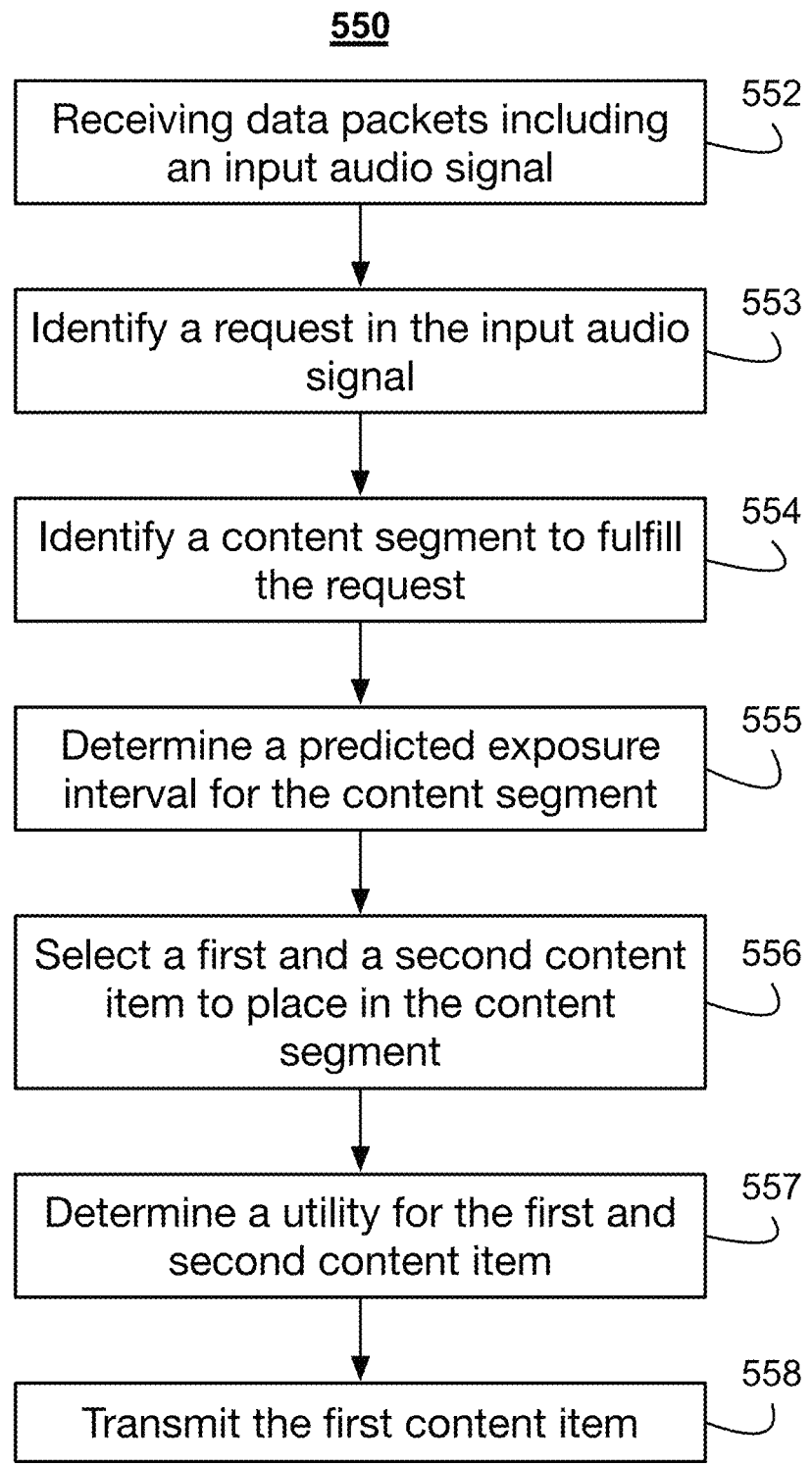
FIG. 5B illustrate a block diagram of an example method for the transmission of packetized data in a voice activated, data packet based computer network environment.

FIG. 5B illustrate a block diagram of an example method 550 for the transmission of packetized data in a voice activated, data packet based computer network environment. The method 550 can include receiving data packets that can include an input audio signal (step 552). The method 550 can include identifying a request in the input audio signal (step 553). The method 550 can include identifying a content segment to fulfill the request (step 554). The method 550 can include determining a predicted exposure interval for the content segment (step 555). The method 550 can include selecting a first and a second candidate content item (or other digital component) to place in the content segment (step 556). The method 550 can include determining a utility for the first and the second candidate content item (step 557). The method 550 can include transmitting the first candidate content item (step 558).

The method 550 can include receiving data packets that can include an input audio signal (step 552). The data processing system can receive the data packets at an interface. The input audio signal can be detected by a sensor, such as a microphone, located at or on a client computing device. For example, the data processing system can execute, launch, or invoke the NLP component to receive packet or other protocol based transmissions via the network from the client computing device. The data packets can include or correspond to an input audio signal detected by the sensor, such as an end user saying "OK, I would like to go to go dinner and then a movie tonight" into a smartphone.

The method 550 can include identifying a request in the input audio signal (step 553). The method 550 can also include identifying a trigger keyword in the input audio signal. The NLP component can parse the input audio signal to identifying the first request and the trigger keyword that corresponds to the first request. For example, the NLP component can parse the input audio signal to identify requests ("dinner" or "movie") as well as trigger keywords "go" "go to" or "to go to" that correspond or relate to the request. The method 550 can also include determine at least one thread based on the requests and the trigger keywords. The thread can include a series of sequence dependent actions that the data processing system can determine will occur in a set order, such as a thread. The thread can include a plurality of related actions. Receiving a thread by the data processing system can include receiving a series of input audio signals that include related requests. For example, "Ok, what movies are playing tonight" and "Ok, what restaurants are near the theater" can be included in a thread because the two input audio signals relate to activities the user is interested in performing in a single outing. In some implementations, the subsequent requests and actions can be dependent on a response to a previous response or content item.

In some implementations, prediction component can determine a score that indicates the likelihood that the first input audio signal is the beginning of a thread. The likelihood score can indicate the likelihood of receiving data packets that include a second input audio signal with a second request that is related to the first request. For example, "Ok, what movies are playing tonight" can have a high likelihood score of being the start of a thread based on historical data indicating that when users generate input audio signals requesting information related to movies, the user over requests additional information such dinner reservation availability. Another example, input audio signal of "Ok, what is the weather" can have a relatively low likelihood score because historical data can indicate that user do not typically as additional questions relating to the weather after receiving the local weather. In some implementations, the prediction component can predict a number of actions associated with the trigger keyword and the first request.

The method 550 can include identifying a content segment to fulfill the request (step 554). The content segment that the data processing system identifies can include a plurality of elements. The elements can be content items that include audio segments that are identified in response to the request and trigger keyword. For example, in response to the request "OK, what time is it?" The element could be an audio signal that includes the automated voice speaking the current time. The content segment and one or more elements can be transmitted to the client computing device that generated the input audio signal for play back to the user. In some implementations, the elements can be audio or other templates into which the content items are inserted. The elements can be selected based on the request or trigger keyword. For example, a template for "OK, what time is it?" could be "The time is." To this template, a content item indicating the specific time can be appended.

The method 550 can include determining a predicted exposure interval for the content segment (step 555). In some implementations, the predicted exposure interval for the content segment is predicted in a method similar to that described above in relation to steps 410-414 of FIGS. 4A and 4B. The predicted exposure interval can be a prediction of an amount of time that a user will engage with the content segment or elements within the content segment. The prediction can be based on an average time previous users engaged with the content segment. For example, a content segment can include audio elements that are 60 seconds in length. If, on average, the user terminates the playback of the audio segment after 50 seconds, the content segment can have a predicted exposure interval of 50 seconds.

If the likelihood score that the input audio signal is the start of a thread, the prediction component can predict a predicted exposure interval for each of the content segments that can be identified responsive to the subsequent actions in the thread. For example, if there is a 75% chance that the second request "OK, what dinner reservations are available near the movie theater" will follow the first request of "OK, what movies are playing." The predicted component can calculate the predicted exposure interval for the content segment to fulfill the second request. The predicted exposure interval of the content segment to fulfill the second request can be a function of the likelihood that the second request will follow the first request in a thread. For example, in isolation, the content segment to fulfill the second request can have a predicted exposure interval of 45 seconds. In the above example, the content segment to fulfill the second request can be determined to have a predicted exposure interval of 33.75 second (45 seconds×75%). The prediction component can calculate a total predicted exposure interval as the sum of each of each of the predicted exposure intervals for the content segments to fulfill the requests in the thread.

The method 550 can include selecting a first and a second candidate content item to place in the content segment (step 556). The first and the second candidate content items can each have display parameters. The first and the second candidate content items can be selected as candidate content items that can possibly be included in the content segment. Before selection to transmission to the client computing device, the content items can be referred to as candidate content items. The display parameters of the first and the second candidate content items can be different. For example, the first candidate content item can have a non-time based display parameter and the second candidate content item can have a time based display parameter. In some implementations, the first candidate content item and the second candidate content item can be the same candidate content item, but one version that has a non-time based display parameter and another version that has a time based display parameter. The display parameters can be a bid value that a publisher is willing to pay for the presentation of their respective content items. The time based display parameter can be CPT bid and the non-time based display parameter can be non-CPT bid, such as CPC bid.

The first and the second candidate content items can be audio or other media content items that are inserted into or appended to the content segments and transmitted to the client computing device. For example, in response to "OK, what restaurants are near the theater" the content item could be information for a specific restaurant. The content item could be included with the content segment as response to the request. The content item could be appended to the content segment as to provide additional information after the response to the request is provided. For example, the content item may include information about an Italian restaurant not close to the movie theater, but one which the user of the client computing device might be interested in visiting.

The method 550 can include determining a utility for the first and the second candidate content item (step 557). The utility can be an indication of the expected revenue to be generated by the selection and presentation of the respective content items. The step 557 can be similar to the above described step 430 described in relation to FIG. 4A.

The determination of the utility of the first and second candidate content items can be based on the display parameters of the candidate content items and the predicted exposure interval for the content segments. In one example with first, second, and third candidate content items, the candidate content items can have the display parameters, a CPM bid of up to $0.05 per impression, a CPC bid of up to $0.15 for per click, and a CPT bid for up to $0.01/second, respectively. In this example, if the predicted exposure interval is four seconds, deploying the candidate content item associated with a CPM bid yields $0.05 of revenue for the publisher, while deploying the candidate content item associated with a CPT bid yields $0.04 of revenue ($0.01/second×4 seconds). Accordingly, a candidate content item associated with a CPM bid is preferable, in this example, to a candidate content item associated with a CPT bid in such a content segment. In some implementations, the data processing system can increase a bid value of a candidate content item based on the predicted exposure interval. For example, if the predicted exposure interval is high or the input request is likely to be the start of a thread, the additional exposure can be valuable to the publisher because it is more likely that the entirety of their candidate content item will be presented. Based on instructions from the publisher, the data processing system can increase the bid value of the publisher's content items when the predicted exposure interval is above a predetermined threshold.

The method 550 can include transmitting the first candidate content item (step 558). The first candidate content item can be selected responsive to having a utility that is greater than the utility of the second candidate content item. The first content item can be selected as the content item that is transmitted to the client computing device. The content item can be transmitted to the client computing device via an interface. The content item can be transmitted as part of an output signal that includes the content segment. The output signal can be transmitted as data packets to the client computing device. In some implementations, the output signal can be transmitted to a second client computing device that is different than the client computing device that transmitted the input audio signal. The output signal, when received by the client computing device, can cause an application or other component of the client computing device to drive a speaker that generates an acoustic wave that corresponds to the output signal. In cases when the input request is the start of a thread, the data processing system can also transmit additional data packets that additional content items that are selected responsive to the additional requests of the thread.

Figure 7:
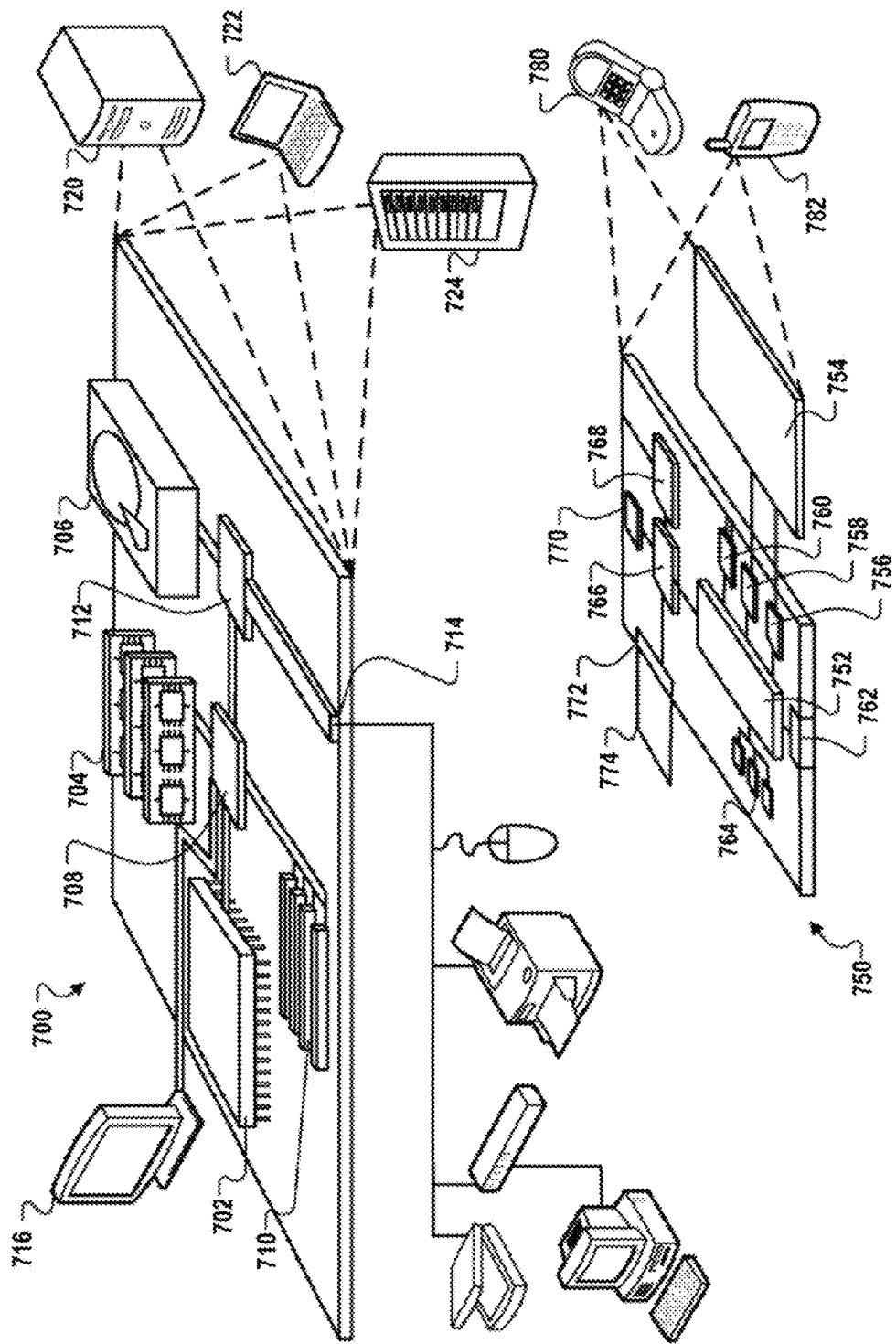
FIG. 7 shows an example of a computing device and a mobile computing device that can be used in connection with computer-implemented methods and systems described in the present specification.

FIG. 7 shows an example of a computing device 700 and a mobile computing device that can be used to implement the techniques described herein the present specification. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multiprocessor system).

The memory 704 stores information within the computing device 700. In some implementations, the memory 704 is a volatile memory unit or units. In some implementations, the memory 704 is a non-volatile memory unit or units. The memory 704 can also be another form of computer-readable medium, such as a magnetic or optical disk.

The storage device 706 is capable of providing mass storage for the computing device 700. In some implementations, the storage device 706 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which can accept various expansion cards (not shown). In the implementation, the low-speed interface 712 is coupled to the storage device 706 and the low-speed expansion port 714. The low-speed expansion port 714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a standard server 720, or multiple times in a group of such servers. In addition, it can be implemented in a personal computer such as a laptop computer 722. It can also be implemented as part of a rack server system 724. Alternatively, components from the computing device 700 can be combined with other components in a mobile device (not shown), such as a mobile computing device 750. Each of such devices can contain one or more of the computing device 700 and the mobile computing device 750, and an entire system can be made up of multiple computing devices communicating with each other.

The mobile computing device 750 includes a processor 752, a memory 764, an input/output device such as a display 754, a communication interface 766, and a transceiver 768, among other components. The mobile computing device 750 can also be provided with a storage device, such as a micro-drive or other device, to provide additional storage. Each of the processor 752, the memory 764, the display 754, the communication interface 766, and the transceiver 768, are interconnected using various buses, and several of the components can be mounted on a common motherboard or in other manners as appropriate.

The processor 752 can execute instructions within the mobile computing device 750, including instructions stored in the memory 764. The processor 752 can be implemented as a chipset of chips that include separate and multiple analog and digital processors. The processor 752 can provide, for example, for coordination of the other components of the mobile computing device 750, such as control of user interfaces, applications run by the mobile computing device 750, and wireless communication by the mobile computing device 750.

The processor 752 can communicate with a user through a control interface 758 and a display interface 756 coupled to the display 754. The display 754 can be, for example, a TFT (Thin-Film-Transistor Liquid Crystal Display) display or an OLED (Organic Light Emitting Diode) display, or other appropriate display technology. The display interface 756 can comprise appropriate circuitry for driving the display 754 to present graphical and other information to a user. The control interface 758 can receive commands from a user and convert them for submission to the processor 752. In addition, an external interface 762 can provide communication with the processor 752, so as to enable near area communication of the mobile computing device 750 with other devices. The external interface 762 can provide, for example, for wired communication in some implementations, or for wireless communication in other implementations, and multiple interfaces can also be used.

The memory 764 stores information within the mobile computing device 750. The memory 764 can be implemented as one or more of a computer-readable medium or media, a volatile memory unit or units, or a non-volatile memory unit or units. An expansion memory 774 can also be provided and connected to the mobile computing device 750 through an expansion interface 772, which can include, for example, a SIMM (Single In Line Memory Module) card interface. The expansion memory 774 can provide extra storage space for the mobile computing device 750, or can also store applications or other information for the mobile computing device 750. Specifically, the expansion memory 774 can include instructions to carry out or supplement the processes described above, and can include secure information also. Thus, for example, the expansion memory 774 can be provided as a security module for the mobile computing device 750, and can be programmed with instructions that permit secure use of the mobile computing device 750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 can communicate wirelessly through the communication interface 766, which can include digital signal processing circuitry where necessary. The communication interface 766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 768 using a radio-frequency. In addition, short-range communication can occur, such as using a Bluetooth, WiFi, or other such transceiver (not shown). In addition, a GPS (Global Positioning System) receiver module 770 can provide additional navigation- and location-related wireless data to the mobile computing device 750, which can be used as appropriate by applications running on the mobile computing device 750.

The mobile computing device 750 can also communicate audibly using an audio codec 760, which can receive spoken information from a user and convert it to usable digital information. The audio codec 760 can likewise generate audible sound for a user, such as through a speaker, e.g., in a handset of the mobile computing device 750. Such sound can include sound from voice telephone calls, can include recorded sound (e.g., voice messages, music files, etc.) and can also include sound generated by applications operating on the mobile computing device 750.

The mobile computing device 750 can be implemented in a number of different forms, as shown in the figure. For example, it can be implemented as a cellular telephone 780. It can also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable storage medium and computer-readable storage medium refer to any computer program product, apparatus and/or device (e.g., magnetic discs, optical disks, memory, Programmable Logic Devices (PLDs)) used to provide machine instructions and/or data to a programmable processor, including a machine-readable storage medium that receives machine instructions as a machine-readable signal. The term machine-readable signal refers to any signal used to provide machine instructions and/or data to a programmable processor. A machine-readable storage medium does not include a machine-readable signal.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for transmission of packetized data in a voice activated data packet based computer network environment, comprising:
    a data processing system comprising a hardware processor and a memory to:
        receive, via an interface, data packets comprising an input audio signal detected by a sensor of a client computing device;
        identify a first request within the input audio signal detected by the sensor of the client computing device;
        identify a content segment to fulfill the first request, the content segment comprising one or more elements;
        determine a predicted exposure interval for the content segment based on the one or more elements;
        select a first candidate digital component to place in the content segment, the first candidate digital component comprising a time based display parameter;
        select a second candidate digital component to place in the content segment, the second candidate digital component comprising a non-time based display parameter;
        determine a first utility value of the first candidate digital component based on the time based display parameter and the predicted exposure interval;
        determine a second utility value of the second candidate digital component based on the non-time based display parameter;
        determine that the first utility value is greater than the second utility value; and
        transmit, responsive to determining the first utility value is greater than the second utility value, data packets comprising an output signal including the first candidate digital component.

2. The system of claim 1, comprising a natural language processor component that:
    receives, via the interface, the data packets comprising the input audio signal; and
    parses the input audio signal to identify the first request and a trigger keyword corresponding to the first request.

3. The system of claim 2, comprising:
a prediction component that determines a thread based on the trigger keyword and the first request.

4. The system of claim 3, comprising the prediction component that:
determines a predicted number of actions associated with the trigger keyword and the first request; and
determines the predicted exposure interval for each of the first candidate digital component and the second candidate digital component based on the predicted number of actions.

5. The system of claim 4, comprising the data processing system to:
transmit the data packets comprising the output signal including the first candidate digital component to the client computing device responsive a first action; and
transmit additional data packets comprising a second output signal including a third digital component to the client computing device responsive to a second action.

6. The system of claim 1, comprising:
the data processing system configured to transmit the data packets comprising the output signal including the first candidate digital component to a second client computing device.

7. The system of claim 1, comprising a prediction component that:
determines a score indicating a likelihood of receiving data packets comprising a second input audio signal comprising a second request that is related to the first request; and
determines the predicted exposure interval for each of the first candidate digital component and the second candidate digital component based on the score.

8. The system of claim 7, wherein the second request is generated responsive to the first candidate digital component.

9. The system of claim 1, comprising:
a content selector component to select the one or elements based on the first request.

10. The system of claim 1, comprising:
the data processing system configured to increase a bid value of the first candidate digital component based on the predicted exposure interval of the first candidate digital component.

11. A method of transmission of data in a voice activated computer network environment, comprising:
receiving, via an interface, data packets comprising an input audio signal detected by a sensor of a client computing device;
identifying a first request within the input audio signal detected by the sensor of the client computing device;
identifying a content segment to fulfill the first request, the content segment comprising one or more elements;
determining a predicted exposure interval for the content segment based on the one or more elements;
selecting a first candidate digital component to place in the content segment, the first candidate digital component comprising a time based display parameter;
selecting a second candidate digital component to place in the content segment, the second candidate digital component comprising a non-time based display parameter;
determining a first utility value of the first candidate digital component based on the time based display parameter and the predicted exposure interval;
determining a second utility value of the second candidate digital component based on the non-time based display parameter;
determining that the first utility value is greater than the second utility value; and
transmitting, responsive to determining the first utility value is greater than the second utility value, data packets comprising an output signal including the first candidate digital component to the client computing device.

12. The method of claim 11, comprising:
receiving, by a natural language processor component, the data packets comprising the input audio signal; and
parsing, by the natural language processor component, the input audio signal to identify the first request and a trigger keyword corresponding to the first request.

13. The method of claim 12, comprising:
determining, by a prediction component, a thread based on the trigger keyword and the first request.

14. The method of claim 13, comprising:
determining, by the prediction component, a predicted number of actions associated with the trigger keyword and the first request; and
determining, by the prediction component, the predicted exposure interval for each of the first candidate digital component and the second candidate digital component based on the predicted number of actions.

15. The method of claim 14, comprising:
transmitting the data packets comprising the output signal including the first candidate digital component to the client computing device responsive a first action; and
transmitting additional data packets comprising a second output signal including a third digital component to the client computing device responsive to a second action.

16. The method of claim 11, comprising:
transmitting the data packets comprising the output signal including the first candidate digital component to a second client computing device.

17. The method of claim 11, comprising:
determining, by a prediction component, a score indicating a likelihood of receiving data packets comprising a second input audio signal comprising a second request that is related to the first request; and
determining, by the prediction component, the predicted exposure interval for each of the first candidate digital component and the second candidate digital component based on the score.

18. The method of claim 17, wherein the second request is generated responsive to the first candidate digital component.

19. The method of claim 11, comprising:
selecting the one or elements based on the first request.

20. The method of claim 11, comprising:
increasing a bid value of the first candidate digital component based on the predicted exposure interval of the first candidate digital component.

* * * * *